(12) United States Patent
Thacker et al.

(10) Patent No.: US 10,535,076 B1
(45) Date of Patent: Jan. 14, 2020

(54) DEAL PROGRAM LIFE CYCLE

(71) Applicant: Groupon, Inc., Chicago, IL (US)

(72) Inventors: David Thacker, Burlingame, CA (US); David Hoover, Wheaton, IL (US); Anthony Caliendo, Chicago, IL (US); Ruslan Gilfanov, Mountain View, CA (US); Amit Aggarwal, Sunnyvale, CA (US)

(73) Assignee: GROUPON, INC., Chicago, IL (US)

( * ) Notice: Subject to any disclaimer, the term of this patent is extended or adjusted under 35 U.S.C. 154(b) by 739 days.

(21) Appl. No.: 13/839,499

(22) Filed: Mar. 15, 2013

Related U.S. Application Data

(60) Provisional application No. 61/707,781, filed on Sep. 28, 2012.

(51) Int. Cl.
*G06Q 30/02* (2012.01)

(52) U.S. Cl.
CPC .................. *G06Q 30/0251* (2013.01)

(58) Field of Classification Search
CPC ............. G06Q 30/0269; G06Q 30/0235
See application file for complete search history.

(56) References Cited

U.S. PATENT DOCUMENTS

| | | | | |
|---|---|---|---|---|
| 9,189,811 B1* | 11/2015 | Bhosle | ............... | G06Q 30/0631 |
| 2003/0105664 A1* | 6/2003 | Van Luchene | ....... | G06Q 10/087 |
| | | | | 705/14.13 |
| 2003/0204444 A1* | 10/2003 | Van Luchene | ......... | G06Q 30/02 |
| | | | | 705/16 |
| 2005/0010472 A1* | 1/2005 | Quatse | ................... | G06Q 30/02 |
| | | | | 705/14.13 |
| 2006/0143080 A1* | 6/2006 | Garg | .................. | G06F 17/3087 |
| | | | | 705/14.24 |
| 2006/0178930 A1* | 8/2006 | Kim | ....................... | G06Q 30/02 |
| | | | | 705/14.13 |
| 2011/0078026 A1* | 3/2011 | Durham | ................ | G06Q 30/02 |
| | | | | 705/14.66 |
| 2011/0276400 A1* | 11/2011 | Kurnit | .................... | G06Q 30/02 |
| | | | | 705/14.55 |
| 2012/0022944 A1* | 1/2012 | Volpi | ..................... | G06Q 30/00 |
| | | | | 705/14.53 |
| 2012/0209686 A1* | 8/2012 | Horowitz | ................ | H04W 4/21 |
| | | | | 705/14.26 |
| 2012/0265597 A1* | 10/2012 | Saha | ....................... | G06Q 30/02 |
| | | | | 705/14.28 |

(Continued)

OTHER PUBLICATIONS

U.S. Appl. No. 13/411,502, filed Mar. 2, 2012; In re: O'Brien et al., entitled *Relevance System for Consumer Deals*.

(Continued)

*Primary Examiner* — Gautam Ubale
(74) *Attorney, Agent, or Firm* — Alston & Bird LLP

(57) ABSTRACT

A deal program life cycle system and method is disclosed. The deal program life cycle may oversee the issuance of deals from a deal program to consumers over the life cycle of the deal program. One or more aspects of the deal program may change during different periods of the life cycle of the deal program. For example, the deal program may include deal features, a number of units for deals, and relevance features for the deal program. The deal features, number of units of deals, and/or relevance features for the deal program may change during the different periods of the life cycle.

16 Claims, 16 Drawing Sheets

(56) References Cited

U.S. PATENT DOCUMENTS

| | | | | |
|---|---|---|---|---|
| 2013/0041735 A1* | 2/2013 | Johnson | ............ | G06Q 30/0207 705/14.23 |
| 2013/0073381 A1* | 3/2013 | Binkley | ................ | G06Q 30/02 705/14.48 |
| 2013/0179264 A1* | 7/2013 | Wilson | .................. | G06Q 30/02 705/14.58 |
| 2013/0268328 A1* | 10/2013 | Kurapati | ............ | G06Q 30/0207 705/14.1 |

OTHER PUBLICATIONS

U.S. Appl. No. 13/460,745, filed Apr. 30, 2012; In re: Thacker et al., entitled *Sales Enhancement System*.
U.S. Appl. No. 13/756,145, filed Jan. 31, 2013; In re: Thacker et al., entitled *Pre-Feature Promotion System*.
U.S. Appl. No. 61/593,262, filed Jan. 31, 2012; In re: Thacker et al., entitled *Pre-Feature Promotion System*.
U.S. Appl. No. 61/707,781, filed Sep. 28, 2012; In re: Thacker et al., entitled *Deal Program Life Cycle*.

* cited by examiner

An example trigger includes receiving a request for a deal program, which the request seeking a deal program with attribute(s) related to:

- a deal program or units of a deal program
- customer or subscriber status
- measurable historical activity of the customer or subscriber, such as purchases, locations (or travel), survey answers, responsiveness to impressions, returns, breakages, or reviews of merchants
- status or quality of a merchant, such as a merchant receiving positive reviews
- measurable historical activity of the merchant, such as a merchant being in business for over a year
- any parameter or condition measured or analyzed by the relevance system
- location of the source of the request, such as the location of the user making the request or with respect to location in a source webpage, email, SMS text, or voicemail

*Fig. 4D*

DEAL PROGRAM LIFE CYCLE

REFERENCE TO RELATED APPLICATION

This application claims the benefit of U.S. Provisional Application No. 61/707,781, filed Sep. 28, 2012, the entirety of which is hereby incorporated by reference herein.

TECHNICAL FIELD

The present description relates to offering deals associated with a product or a service. This description more specifically relates to a sales enhancement system for determining which deals to offer for a product or a service.

BACKGROUND

Merchants typically offer deals to consumers, such as promotional deals. Also, companies typically offer promotions to other companies. The deals offered may be in the form of discounts, rewards, or the like. When offering the deal, a merchant or company can seek to focus the offer to a subset of consumers. In order to select those consumers in the subset, the merchant may analyze data generated from similar deal programs. However, the analysis to determine which deals to offer to the consumers can prove difficult.

SUMMARY

A deal program life cycle system and method are disclosed.

In one aspect, a method is provided for managing a deal program through multiple time periods. The method includes: associating, in one or more memories, the deal program during a first time period with a first deal program collection; during the first time period, offering deals from the deal program from an associated publicly available datapage; during the first time period, using a relevance engine in order to determine whether to offer one or more deals from the first deal program collection to a consumer; after the first time period, associating the deal program during a second time period with a second deal program collection, the second time period being different from the first time period; and during the second time period, in response to the relevance engine detecting a predefined event relating to the first deal program collection, using the relevance engine in order to determine whether to offer the deal from the deal program to the consumer.

In another aspect, a system is provided for managing a deal program through multiple time periods. The system includes: a memory storing processor-executable instructions; and a processor in communication with the memory. The processor is configured to execute the processor-executable instructions to: associate the deal program during a first time period with a first deal program collection; during the first time period, offer deals from the deal program from an associated publicly available datapage; during the first time period, determine whether to offer one or more deals from the first deal program collection to a consumer; after the first time period, associate the deal program during a second time period with a second deal program collection, the second time period being different from the first time period; and during the second time period, in response to detecting a predefined event relating to the first deal program collection, determine whether to offer the deal from the deal program to the consumer.

In still another aspect, a method is provided for managing an offer for a deal from a deal program. The method includes: transmitting the offer to a consumer electronic device, the offer including an indication of a period of time in which to accept the offer and a link to accept the offer, activation of the link configured to access a datapage, the datapage having a publicly available period and a link-activation period, the publicly available period comprising a period in which the datapage is publicly searchable via a server, the link-activation period comprising a later period in which the datapage is only accessible via the server by activating the link; receiving a communication, responsive to activation of the link, for a request to accept the offer; determining whether the request to accept the offer is within the link-activation period; in response to determining that the request to accept the offer is within the link-activation period, processing the request; and in response to determining that the request to accept the offer is outside of the link-activation period, rejecting the request.

In yet another aspect, a system is provided for managing an offer for a deal from a deal program. The system includes: a memory storing processor-executable instructions; and a processor in communication with the memory. The processor is configured to execute the processor-executable instructions to: transmit the offer to a consumer electronic device, the offer including an indication of a period of time in which to accept the offer and a link to accept the offer, activation of the link configured to access a datapage, the datapage having a publicly available period and a link-activation period, the publicly available period comprising a period in which the datapage is publicly searchable via a server, the link-activation period comprising a later period in which the datapage is only accessible via the server by activating the link; receive a communication, responsive to activation of the link, for a request to accept the offer; determine whether the request to accept the offer is within the link-activation period; in response to determining that the request to accept the offer is within the link-activation period, process the request; and in response to determining that the request to accept the offer is outside of the link-activation period, reject the request.

Other systems, methods, and features will be, or will become, apparent to one with skill in the art upon examination of the following figures and detailed description. It is intended that all such additional systems, methods, features and be included within this description, be within the scope of the disclosure, and be protected by the following claims.

BRIEF DESCRIPTION OF THE DRAWINGS

The present application can be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals can refer to like parts throughout the different figures unless otherwise specified.

FIG. 4D illustrates an example trigger.

DETAILED DESCRIPTION

Figure 1A:
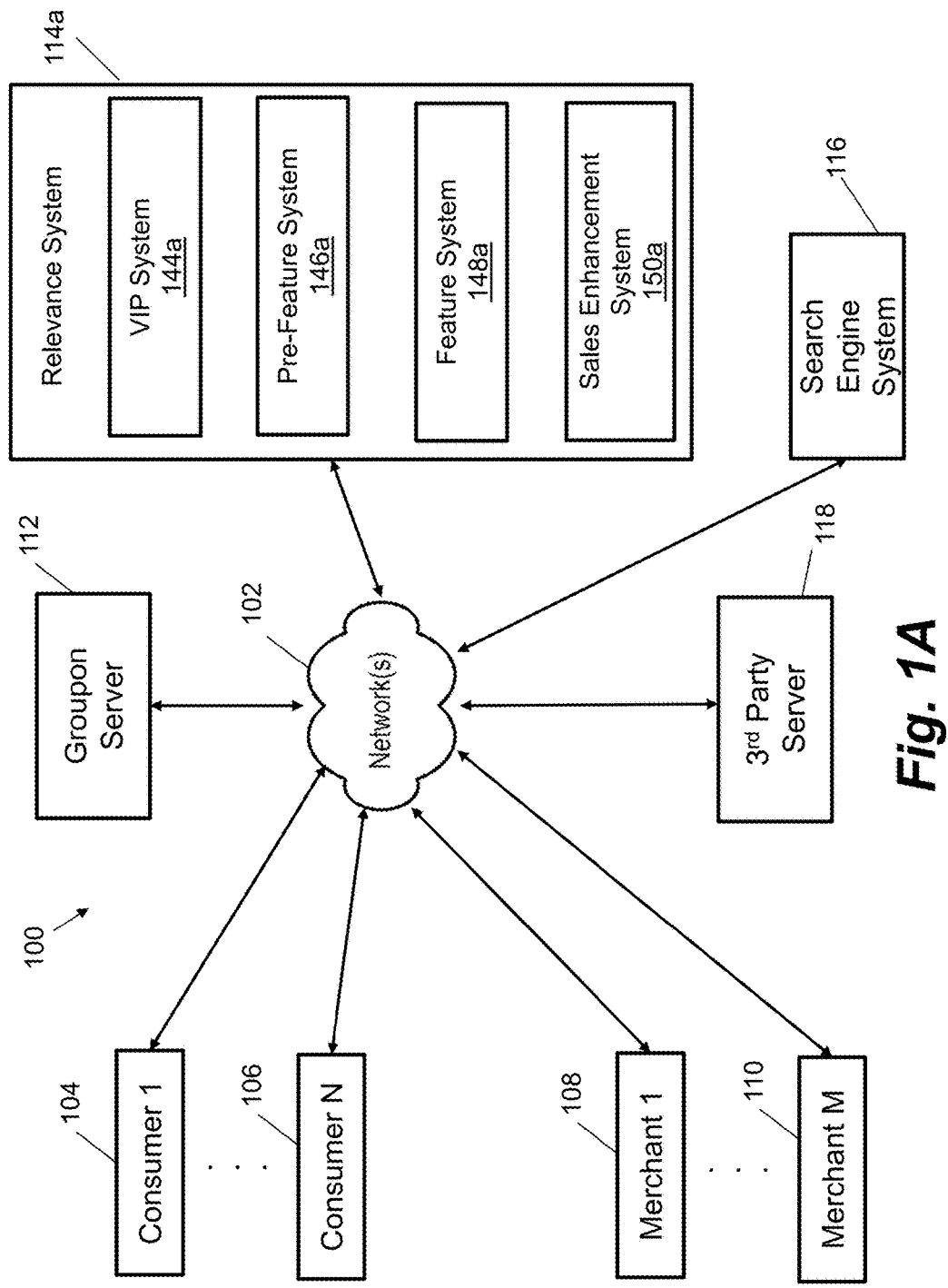
FIG. 1A illustrates an example network architecture for an electronic commerce system.

A deal may include any type of reward, discount, coupon, credit, promotion, voucher or the like used toward part (or all) of the purchase of a product or a service. The deal may be part of a deal program, which may include, without limitation, deal features, a number of units for deals, and relevance features for the deal program.

Examples of deal features include, without limitation, the store at which the deal is offered, an amount discounted, and a period (after the deal is purchased or accepted) when the deal is valid for use. In addition, an example of the number of units for the deal program may include a number of goods or services available for purchase or acceptance (e.g., an inventory of 100 hard goods, or 100 available promotion offers for a $40 reduction in the cost of a dinner). Alternatively, or in addition, the number of units may include a number of offers (or impressions) for deals (e.g., 100 offers to consumers of the promotion deal for $40 reduction in the cost of a dinner).

Further, examples of relevance features for a deal program may include, but are not limited to: a time period during which deals for the deal program are offered (e.g., deals from the deal program may be offered for one week, one month, six months, for the Christmas shopping season, etc.), which may include a length of the time period, a start time/date and an end time/date for the time period at which deals may begin to be offered; a time period, after offering the deal to the consumer, during which the consumer may purchase or accept the deal (e.g., 2 hours or 2 days after an offer is transmitted to the consumer to accept the deal); a time period in which deals may be used by the consumer (e.g., 1 month after purchase of the deal); a shelf life of a unit (explained in detail below); marketing channels associated with the deal program; a preferred geographic region of the deal program (e.g., a geographic region used to target consumers); and information pertaining to probable consumers (e.g., various attributes for target consumers).

The deal program may have a life cycle, in which at least a part of the deal program may change during different periods of the life cycle. As discussed above, the deal program may include deal features, a number of units for deals, and relevance features for the deal program. One, some or all of the deal features, number of units of deals, and relevance features for the deal program may change during the different periods of the life cycle.

As discussed in more detail below with respect to FIG. 3, the deal program may have different periods including, for example, the pre-feature period, the VIP period, the feature period, the mulligan period and the sales enhancement period. In one embodiment, the deal program may transition to the different periods and cannot transition back to a previous period. One or more aspects of the deal program may change in each of the different periods. So that, in one embodiment, the deal program may be viewed as being segmented into different deal programs for the different periods of the life cycle. For example, the deal program may be segmented into a pre-feature deal program (with characteristics of the deal program specific to the pre-feature period) for the pre-feature period, a VIP deal program (with characteristics of the deal program specific to the VIP period) for the VIP period, a feature deal program (with characteristics of the deal program specific to the feature period) for the feature period, a mulligan deal program (with characteristics of the deal program specific to the mulligan period) for the mulligan period, and a sales enhancement deal program (with characteristics of the deal program specific to the sales enhancement period) for the sales enhancement period. The example of the segmented deal programs are merely for illustration purposes.

Further, the different deal programs may be associated with or included into different deal program collections. In the example given above, if the deal program is segmented into a particular deal program (labeled above as the "feature deal program"), the feature deal program may be associated with or included into a feature deal program collection. The feature deal program collection may include a compilation of different deal programs that are for use during the feature period of the respective deal program's feature period. For example, the feature deal program collection may include 100 different feature deal programs, with each of the 100 feature deal programs having the particular characteristics associated with the feature period (such as being publicly available to all customers during a specific time period of the deal program's life cycle). As other examples, a deal program segmented into a pre-feature deal program, VIP deal program, or a sales enhancement deal program may be associated with or included into a respective pre-feature deal program collection, VIP deal program collection, or sales enhancement deal program collection. As discussed in more detail below, association with or inclusion into a particular deal program collection may be accomplished in one of several ways.

The different deal program collections may be used by the system in different ways. For example, the different deal collections may be used for different classes of electronic promotion correspondence. As discussed in more detail below, the relevance system may control the sending of deals for different classes of electronic promotion correspondence. A promotion class may refer to any configurable categorization of deals set by the relevance system. For example, the relevance system may specify deals for products or goods as belonging to a first promotion class (e.g., "goods" promotions). As another example, the relevance system may specify time-sensitive promotions as belonging to particular promotion class (e.g., "deal-of-the-day" promotions) and travel-related promotions as belonging to a different promotion class (e.g., "getaway" promotions). Any number of additional or different classifications may be employed by the relevance system. In one example, the feature deal program collection is associated with the "dealof-the-day" promotion class. The relevance system accesses the feature deal program collection in order to determine which deal, from the feature deal program collection, to select as the "deal-of-the-day" for the consumer. When the deal program is associated with the feature deal program collection, the deal program is considered a part of the "deal-of-the-day" promotion class. In another time period, the deal program may be associated with the sales enhancement deal program collection, and thus is part of another promotion class.

The changes in the deal program during the various periods in the life cycle result in one or more of the following being modified: visibility of the deal program to the consumer; accessibility of the deal program to the consumer; targeted consumers for the deal program; methods in which to access the deal program; and numbers of consumers targeted.

Visibility of the deal program to the consumer (such as to all consumers or to a subset of consumers) may change during different periods of the life cycle of the deal program. For example, the deal program may be publicly visible by all consumers (or a subset of consumers) during one period of the life cycle, and may not be publicly visible to all of the consumers (or the subset of consumers) during an other period of the life cycle. In one embodiment, the deal program is stored in a database, in which all deal programs stored therein are publicly searchable by all consumers without restriction. So that, the customer may search (and identify) the deal program. In an alternate embodiment, the deal programs stored in the database are publicly searchable by a subset (but not all) of the consumers. For example, consumers assigned a specific attribute (such as a VIP status) may be allowed to search the database whereas other consumers who are not assigned the specific attribute are not allowed to search the database. In still an alternate embodiment, the deal program may be assigned a tag or an identifier. The tag or identifier may indicate that the deal program is searchable by the customer, such as the customer submitting a search via a web browser to a server (such as Groupon Server 112, discussed below). In the other period of the life cycle, the deal program is not publicly visible or searchable. So that, in the other period of the life cycle, the deal from the deal program is presented to the consumer only when the relevance system (discussed below) selects the deal for the consumer (as opposed to the consumer selecting the deal).

In addition, accessibility of the deal program to the consumer (such as to all consumers or to a subset of consumers) may change during different periods of the life cycle of the deal program. For example, the deal program may be accessible by all consumers (or a subset of consumers) during one period of the life cycle (such as the feature period), and may be inaccessible during an other period of the life cycle (such as publicly inaccessible during the sales enhancement period). In particular, during the one period of the life cycle, all consumers (or a subset of consumers) may access the deal program in order to purchase a deal from the deal program. During the other period of the life cycle, the customers may not access the deal program (e.g., the customer can view the deal program, but on the webpage, the "buy" button for the deal is grayed out, thereby disallowing the customer to purchase a deal from the deal program). Further, the manner in which the deal may be accessible may change during different periods of the life cycle. For example, in one period (such as the feature period, discussed below), the deal may be available for all customers to purchase (such as via a website), and in another period (such as the pre-feature period, the mulligan period, or the sales enhancement period, discussed below), the deal may only be available to a subset of customers (such as those customers that have access to an email or other communication that includes a link to a website to purchase the deal).

Moreover, the targeted consumers for the deal program may change during different periods of the life cycle of the deal program. As discussed above, the relevance features for a deal program may include the one or more attributes of the consumers targeted to receive deals from the deal program. The relevance features may change during different periods of the deal program life cycle so that different sets of consumers are targeted during the different periods of the deal program life cycle. Further, the methods in which to access the deal program may vary during the different periods of the life cycle of the deal program.

In the different periods of the life cycle, deals are offered to consumers. One manner in which to determine which deals to offer to consumers is by use of a relevance system, such as disclosed in U.S. application Ser. No. 13/411,502, which this application incorporates by reference in its entirety. The relevance system may work in combination with other systems, such as VIP system, a pre-feature system, a feature system, and a sales enhancement system (SES) in order to determine one or more deals to offer to consumers in the various periods of the life cycle of a deal program. The sales enhancement system is disclosed, for example, in U.S. application Ser. No. 13/460,745, incorporated by reference herein in its entirety.

Figure 1B:
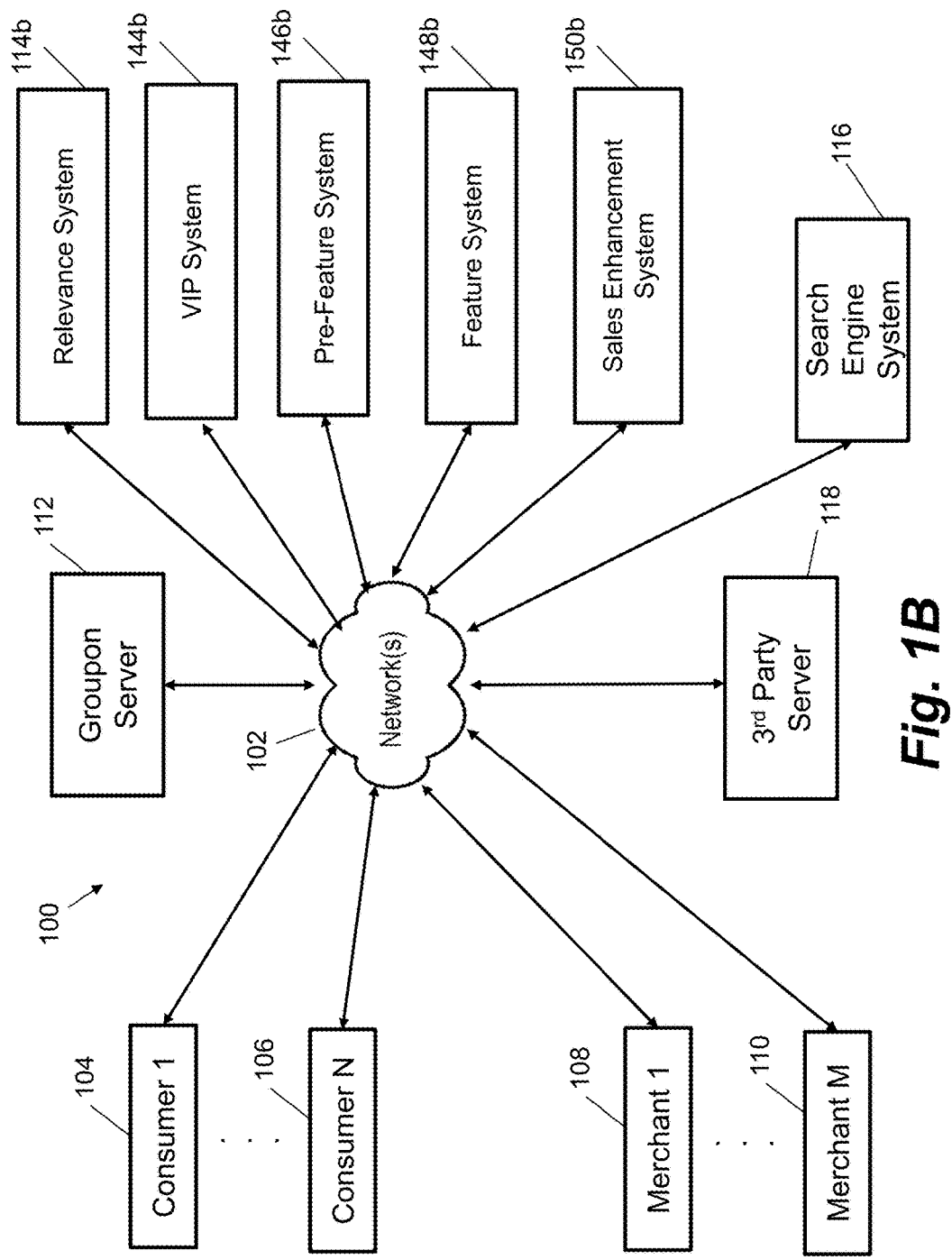
FIG. 1B illustrates another example network architecture for the electronic commerce system.

For example, the pre-feature system (either within a relevance system, such as illustrated in FIG. 1A, or separate from a relevance system, such as illustrated in FIG. 1B) may access the available pre-feature deal programs and select which consumer(s) to offer the pre-feature deal program(s). Likewise, the feature system, the VIP system, and the sales enhancement system may access the respective available deal programs and select which consumer(s) to offer the pre-feature deal program(s). Further, the pre-feature system, the feature system, the VIP system, and the sales enhancement system may work separately to present deals to consumers, or may work in concert. As one example, the relevance system, in combination with the pre-feature system, the feature system, the VIP system, and the sales enhancement system, may select the best deal(s) to present to the consumer, with the best deal(s) selected amongst the different deal programs (such as pre-feature deal programs, VIP deal programs, feature deal programs, and sales enhancement deal programs). As another example, the different systems may work in concert with one another, such as if the feature system determines that none of the feature deal programs is acceptable, the sales enhancement system may select a more acceptable deal from the sales enhancement deal programs.

For example, the sales enhancement system may be used in the sales enhancement period. The sales enhancement system is configured to populate and/or use one or more deal program collections, such as the sales enhancement deal program collection. As discussed briefly above and in more detail below with respect to FIG. 3, the deal program may be segmented into different deal programs for the different periods of the life cycle. For instance, the deal program may be segmented into a specific deal program that is tagged or designated as being a sales enhancement deal program for use by the sales enhancement system.

As discussed above, the deal programs may be grouped or compiled into one or more deal program collections. An example of a deal program collection may include a sales enhancement collection that includes all deal programs that are designated as being a sales enhancement program. The sales enhancement system is configured to manage deal programs in the one or more deal program collections, such as the sales enhancement collection.

Further, one or both of the relevance system and the sales enhancement system may be configured to manage deal programs at various stages of use including: associating a deal program with the one or more deal program collections (such as assigning a first deal program to a first deal program collection and a second deal program to a second deal program collection); determining the number of deals to assign to the different deal programs (either upon assigning the deal program to the deal program collection or thereafter); using triggers to select which deal program collection(s) to access; transmitting an offer for a deal; and processing acceptances of the offers.

For example, an original deal program may be divided into a first deal program and a second deal program, with the first deal program being stored in or associated with the first deal program collection and the second deal program stored in or associated with the second deal program collection. In one aspect of the invention, the dividing of the deal program may be performed by designating the deal program life cycle, such as illustrated in FIG. 3. For example, deal program life cycle 300 includes the feature period and the sales enhancement period.

Further, in one embodiment, the first deal program collection comprises deal programs that are currently in the feature period and the second deal program collection comprises that are currently in the sales enhancement period. The division of the original deal program may be determined in several ways, as discussed in more detail below. As merely one example, the division may be based on percentages, such as X % of the units from the original deal program being associated with the first deal program in the first deal program collection and Y % of the units from the original deal program being associated with the second deal program in the second deal program collection, where X %+Y %=100%. As another example, the number of units placed in the second deal program is dependent on the number of units sold from the first deal program. Further, the time periods for the first deal program and the second deal program may be different, as discussed in more detail below. For example, the length of the time periods during which deals may be offer for the first deal program or the second deal program may be different (such as deals may be offered from the first deal program for 1 week or less, and deals may be offered from the second deal program for 1 week or more (such as 1 month, 2 months, 6 months, a year or indefinitely)). Due to the longer length of the time period, the second deal program collection may compile a larger number of deals than the first deal program collection. Further, the start time/date and end time/date for offering deals from the first deal program and second deal program may be different. The start time/date for the first deal program may be before the start time/date for the second deal program. Further, the end time/date for the first deal program may be at or before the start time/date for the second deal program. Finally, the triggers in which to access deals in the different deal program collections may be different. As discussed in more detail below, management of the feature deal program collection comprises analyzing periodically (e.g., daily for a "deal-of-the-day") in order to select one or a plurality of deals from the feature deal program collection to present to a consumer. In contrast, management of the sales enhancement deal program collection comprises analyzing in response to triggering events, which may not be periodic or daily as in the management of the feature deal program collection.

Associating a particular deal program with a particular deal program collection may include storing the particular deal program in a database dedicated to storage of deal programs in the particular deal program collection. Alternatively, association with the particular deal program collection may comprise tagging the deal program so that the deal program is considered to be connected to or associated with the particular deal program collection. The sales enhancement system (or the relevance system) may populate the different deal program collections with deal programs, and may assign features to the deal programs based on predetermined criteria.

In one embodiment, the deal program collections are populated by dividing a deal program into the different deal program collections, so that a part of a deal program is associated with a first deal program collection and another part of the deal program is associated with a second deal program collection. For example, an original deal program may include deal features and a number of units for the original deal program (e.g., the number of deals for sale from the original deal program). Part or all of the original deal program may be divided into a first deal program and a second deal program, so that the first deal program and the second deal program have the same deal features as the original deal program, and so that the amount of units for the first deal program and the second deal program are based on the amount of units for the original deal program (e.g., the amount of units for the first deal program plus the amount of units for the second deal program equal the amount of units for the original deal program). For example, the first deal program is the feature deal program and the second deal program is the sales enhancement deal program.

Furthermore, different relevance features may be assigned to the deal programs associated with the different deal program collections. For example, the sales enhancement system (or the relevance system) may assign a first deal program associated with the first deal program collection with first relevance features and a second deal program associated with the second deal program collection with second relevance features, whereby the deal features for the first deal program and the second deal program are the same, but the relevance features are different as a whole or in part (e.g., the first relevance features for the first deal program are different from the second relevance features for the second deal program).

So that, in the example of an original deal program being divided into a first deal program and a second deal program associated with the first and second deal program collections, respectively, the first deal program and the second deal program may have different relevance features (either at the program level (e.g., each deal program has different deal program relevance features) and/or at the collection level (e.g., all the deals associated with a deal program collection have common relevance features). For example, the first deal program collection has a first set of relevance features so that associating the first deal program with the first deal program collection thereby associates the first set of relevance features with the first deal program. Likewise, the second deal program collection has a second set of relevance features (different from the first set) so that associating the second deal program with the second deal program collection thereby associates the second set of relevance features with the second deal program.

Examples of deal program relevance features are discussed above. Examples of deal program collections include, without limitation, a pre-feature deal program collection, VIP deal program collection, feature deal program collection, and sales enhancement deal program collection. Examples of differences between a first deal program collection relevance feature and a second deal program collection relevance feature may include, without limitation: differences in the periods during which units may be offered to and/or purchased by a consumer (e.g., the period to purchase a unit from the first deal program is longer than the period to purchase a unit from the second deal program); differences in the periods during which units may be used by a consumer; and differences in discoverability to purchase a unit (e.g., a unit from the first deal program may be discoverable to anyone and a unit from the second deal program is only discoverable to a predetermined group of consumers, where the predetermined group of consumers can be grouped by demographics and/or historical or real-time information related to purchasing behaviors and web browsing).

In another aspect, the relevance system works in combination with the sales enhancement system in order to determine which deal program(s) to offer to a consumer. The relevance system (alone or in combination with the sales enhancement system) may determine which of the deal program collections to examine for deal program(s) based on a triggering event (trigger). Examples of a trigger include, but are not limited to: determining that no deal program in a first deal program collection has a score that meets a predetermined threshold value (e.g., the probability that a consumer will accept an offer for a deal from the deal programs in the first deal program collection is lower than a desired amount or the conversion rate if offered deals from the deal programs in the first deal program collection is lower than a desired rate); determining a potential upsell to the customer (e.g., if a customer purchases a particular deal, such as a deal from the first deal program collection, a trigger is generated to search a select a deal to offer from the second deal program collection); receiving a request for a deal from a new customer or end user; determining a particular type of customer (e.g., a customer identified with a particular characteristic, such as a frequent shopper); sending a batch email; receiving a request to select a deal program from a second deal program collection due to a consumer already receiving a predetermined number of impressions for one or more deal programs in the first deal program collection; receiving a request for a deal program that has a predetermined period to use a unit of the deal program (e.g., where the predetermined period to use the unit is less than one day); determining a persona of a customer (e.g., when a particular customer provides a specific type of information, such as one or more attributes (for example, a specific type of deal the customer wants or a location where the customer wants a deal), a trigger may be generated to select a specific deal program collection in order to tailor the deal to the persona of the particular customer); receive a request from a customer for a deal that has already ended (e.g., a customer sends a request for a deal from a first deal program in the first deal program collection that has already ended (the time period for offering the deal from the first deal program is ended), the request thereby triggering a search of the second deal program collection to determine whether a second deal program (with deal attributes the same as or similar to the first deal program) is present in the second deal program collection in order to offer a deal from the second deal program to the customer that submitted the request); or receiving a request for a deal in which the request has a predetermined period to purchase the deal. Further, a trigger may include receiving a request for deal program utilizing search engine marketing (e.g., receiving a request for a deal program from an Internet search results page, where the deal program requested can be based on content of the search results page), a deal program utilizing an online advertising channel (e.g., a deal program associated with sporting goods, a deal program associated with dining, etc.), or a deal program associated with a syndication partner (e.g., a deal program advertised through a partner content provider or another deal program provider that is a partner). In addition, a trigger may include receiving a change to a customer profile. For example, a customer may submit information for a customer profile or may submit information to update one or more attributes of an existing profile. The submission or update of the profile may act as a trigger to search the second deal program collection to determine whether a deal program in the second deal program collection includes deal attribute(s) the same or similar to the attributes of the submitted or updated profile. For instance, if the customer adds a neighborhood to the places in which the customer wishes to receive deals, the relevance system may update the customer's profile with the added neighborhood. The sales enhancement system may further receive the added neighborhood and search the second deal program collection in order to find deal(s) which are in the added neighborhood.

In another embodiment, the relevance system examines different deal programs, which have the same deal features, differently based on the relevance features assigned. As discussed above, the relevance system and/or the sales enhancement system assign different relevance features (either at the deal program level and/or at the deal program collection level). The relevance system may use the relevance features in order to determine whether to offer a deal from a deal program collection to a consumer, and may use such features in combination with the trigger to determine which collection to examine.

With respect to one embodiment, an online content provider, such as an online deal provider, may arrange a deal program to promote for a merchant. In an online context, when the deal is arranged, the deal provider and the merchant determine an amount of units (e.g., amount of coupons, tickets, services, goods or impressions (e.g., amount of advertisements, solicitations, or batch emails or voicemails)) that the deal provider may distribute. Usually, all the units or references to the units are associated with one deal program collection. In cases, where the deal provider or the merchant utilizes the sales enhancement system, for example, the sales enhancement system may associate the units in at least two different deal program collections.

For example, the sales enhancement system may associate different time periods to the different deal programs. As discussed above, a deal program may have a time period during which offers may be made from a deal program (such as a start time period for beginning to make offers from the deal program and an end time period for ceasing to make offers) or a time period for acceptance of an offer. This is shown, for example, in FIG. 3 in which the feature period for the feature deal program is three days whereas the sales enhancement period for the sales enhancement deal program is nearly 2 months. Further, as discussed above, the sales enhancement system may assign a majority of the units from a first deal program to a first deal program collection, with a first predetermined period(s) of time (such as for a feature deal program for sale during a feature period), and a remainder of the units or a lesser predetermined percentage of the units in a second deal program collection with a second predetermined period(s) of time (such as for a sales enhancement deal program for sale during a sales enhancement period). The first predetermined period(s) of time may be different from the second predetermined period of time in one of several ways including: the time period during which offers may be made from the deal program (e.g., when the period of time begins, when the period of time ends, and/or the duration of the period of time). In particular, the end time period for offering deals in the first deal program may end before the start time period for beginning to offers deals for the second deal program begins. Further, the time period during which offers may be made from the first deal program may be shorter than the time period during which offers may be made from the second deal program (such as the first period of time being a week and the second period of time being six months). The different time periods are shown, for example, in FIG. 3.

The assigning of the units to the first deal program or the second deal program may be based on historical information or real-time information associated with a respective deal program. Further, the relevance or the sales enhancement system may initially associate units in the first deal program collection (such as the feature deal program collection), and thereafter associate unused units in the second deal program collection (such as the sales enhancement deal program collection) after the time period during which offers may be made from the first deal program. Further, after beginning to offer deals from the first deal program (such as the feature deal program), the sales enhancement system or the relevance system may determine an amount of additional units to assign to the second deal program (such as the sales enhancement deal program), which is already associated with the second deal program collection. Such a determination, as well as any other determination described herein, may be determined based on historical information or real-time information, by the sales enhancement system, the relevance system, or any combination thereof.

In one embodiment, in addition to associating units in the first and second deal program collection, one or both of the relevance system and the sales enhancement system may determine and set parameters associated with a deal program, a consumer, or a set of units (such as a set of the units associated with the first deal program collection or the second deal program collection). Further, the determination and the setting of the parameters may include, without limitation, setting performance/persona parameters associated with a set of units, setting performance/persona parameters associated with the deal program in general (e.g. parameters related to the merchant, beginning and end of the deal program, and discounts), setting relevance system parameters (e.g., see U.S. patent application Ser. No. 13/411, 502), and/or setting consumer characteristics (e.g., gender, age, ethnicity, personal preferences, historical locations, and real-time location). Further, the determinations and the settings of parameters may be based on historical information or real-time information. Also, information associated with a set of units may include, without limitation, an expiration date (e.g., a date the units are no longer usable by a consumer), an amount of units, and a shelf life (e.g., a predetermined extent to which consumers appear to be interested in a unit, or period of time that units will be expected to sell at a predetermined rate). Information associated with a set of impressions may include, without limitation, similar information to information associated with units, positioning in content (e.g., positioning on a webpage), and format.

Further, by separating deal programs into more than one deal program collection, such as the first and the second deal program collection, the system may configure one of the collections, such as the second deal program collection, to offer deals from the deal programs associated with that collection: for a different period and/or for a much longer period of time than deal programs associated with another collection; for a different set of consumers; or in response to different triggering events. For example, a first deal program from the first deal program collection may be offered for one week, after which, the second deal program from the second program collection may be offered for six months. Another example of this is illustrated in FIG. 3 in which the feature period for the feature deal program is 3 days and the sales enhancement period for the sales enhancement deal program is nearly 2 months. Because deal programs may be offered for a longer period of time in the second deal program collection, the second program collection may amass more deal programs and serve as a deal repository or storehouse. More specifically, the second deal program collection (such as the sales enhancement deal program collection) may have a much larger number of deal programs available, such as more than a factor of ten or a factor of one-hundred greater than the first deal program collection. The sheer greater numbers of deal programs available with the second deal program collection thus increases the probability that the relevance system may select a deal to send to the consumer with a higher score, as discussed in more detail below.

In one embodiment, one or both of the sales enhancement system and the relevance system are configured to transmit an impression to a consumer. Impressions may be received, for example, via a web page, an email, a text message (e.g., a text message via Short Message Service (SMS)), a voice message, a phone call, a mailer, or any form of delivering an electronic or printed publication. The impression may include a link (such as a hyperlink) that is a reference to a datapage (such as a webpage that may be resident on a web-based server). Activation of the link enables an electronic device to access the datapage in order to accept the offer (such as by payment of a fee).

Further, the sales enhancement system, alone or in combination with the relevance system, may restrict the transmission of an impression by the deal program collection with which the impression is associated. For example, for one deal program collection, impressions may be freely transmitted (such as for the feature deal program collection which is available for all customers), wherein for another deal program collection, impressions may only be transmitted to predetermined consumers or under predetermined conditions (such as for the VIP deal program collection, which is available only for VIP customers, or for the sales enhancement deal program collection, which may be accessed based on predetermined triggers). As another example, the time in which impressions are sent may vary from one deal program collection to the next. In particular, impressions may be sent for deal programs in the first deal program collection during a first predetermined period of time (such as for one week) whereas impressions may be sent for deal programs in the second deal program collection during a second predetermined period of time (such as for six months) As discussed above, the first predetermined period of time is different from the second predetermined period of time (such as the first predetermined period of time ends before the second predetermined period of time begins, and such as the first predetermined period of time is much shorter than the second predetermined period of time). Further, after the first predetermined period of time, the sales enhancement system can determine an amount of additional impressions of the deal program to transmit to predetermined consumers, and such a determination can be made by the sales enhancement system, the relevance system, or a combination thereof. In addition, the sales enhancement system, alone or in combination with the relevance system, can transmit an impression from a deal program collection to a predetermined consumer based on a characteristic of the predetermined consumer, parameters associated with units of deal program collection (such as the amount of units), deal program features, and relevance features or criteria.

Additionally, besides having the initial period of time for a consumer to accept a unit and the extended period of time to keep units available to consumers, other periods of time may be introduced. For example, a third period of time, described for example in FIG. 3 as the mulligan period and which may be considered a forgiveness period of time, may occur immediately after the initial period of time and prior to the extended period of time. The third period allows the system to distribute units from the first deal program collection (such as the feature deal program collection) under the same relevance features of the first collection for an additional period (e.g., a two-day forgiveness period, such as illustrated in FIG. 3). Then, after the forgiveness period, for example, the extended period of time to keep units available to consumers can occur. Further, these extended periods of time can be associated with the second deal program collection.

FIG. 1A illustrates a network architecture 100 for an electronic commerce system that includes a relevance system 114a, a VIP system 144a, a pre-feature system 146a, a feature system 148a, a sales enhancement system 150a, and a network 102. The network 102 can include, without limitation, one or more wired networks, wireless networks, or combinations thereof. The wireless network can be a cellular telephone network, an 802.11, 802.16, 802.20, or WiMax network. Further, the network 102 can be a public network, such as the Internet, a private network, such as an intranet, or combinations thereof, and can utilize a variety of networking protocols now available or later developed including, but not limited to TCP/IP based networking protocols.

The relevance system 114a communicates with a variety of devices including consumer devices, merchant devices, and servers (including servers that provide search engine capabilities and other website functionality). For example, one or more consumers, illustrated as Consumer 1 (104) through Consumer N (106), can communicate with the network 102. The consumers can use any type of electronic device, such as a mobile computing device (e.g., a smartphone), a palmtop computer, a laptop computer, a desktop computer, or the like. In addition, one or more companies such as merchants, illustrated as Merchant 1 (108) through Merchant M (110), can communicate with the network 102.

FIG. 1A further illustrates servers, such as a Groupon® server 112 and a 3rd party server 118, and network functionality, such as a search engine system 116. As illustrated in FIG. 1A, a VIP system 144a, a pre-feature system 146a, a feature system 148a, the sales enhancement system 150a and the relevance system 114a are depicted separately from the Groupon® server 112. Alternatively, some or all of these systems may be integrated with the Groupon® server 112. Also, as shown in FIG. 1A, a VIP system 144a, a pre-feature system 146a, a feature system 148a, the sales enhancement system 150a are integrated with the relevance system 114a. In this way, the relevance system 114a includes various sub-functions, such as management of pre-feature deal programs (using pre-feature system 146a), VIP deal programs (using VIP system 144a), feature programs (using feature system 148a), and sales enhancement deal programs (using sales enhancement system 150a), as discussed in more detail below. Alternatively, as shown in FIG. 1B, a VIP system 144b, a pre-feature system 146b, a feature system 148b, the sales enhancement system 150b and the relevance system 114b can be separate components that communicate via the network 102. The depictions illustrated in FIGS. 1A and 1B, as well as the other figures referenced herein, are merely for illustration purposes.

Figure 2A:
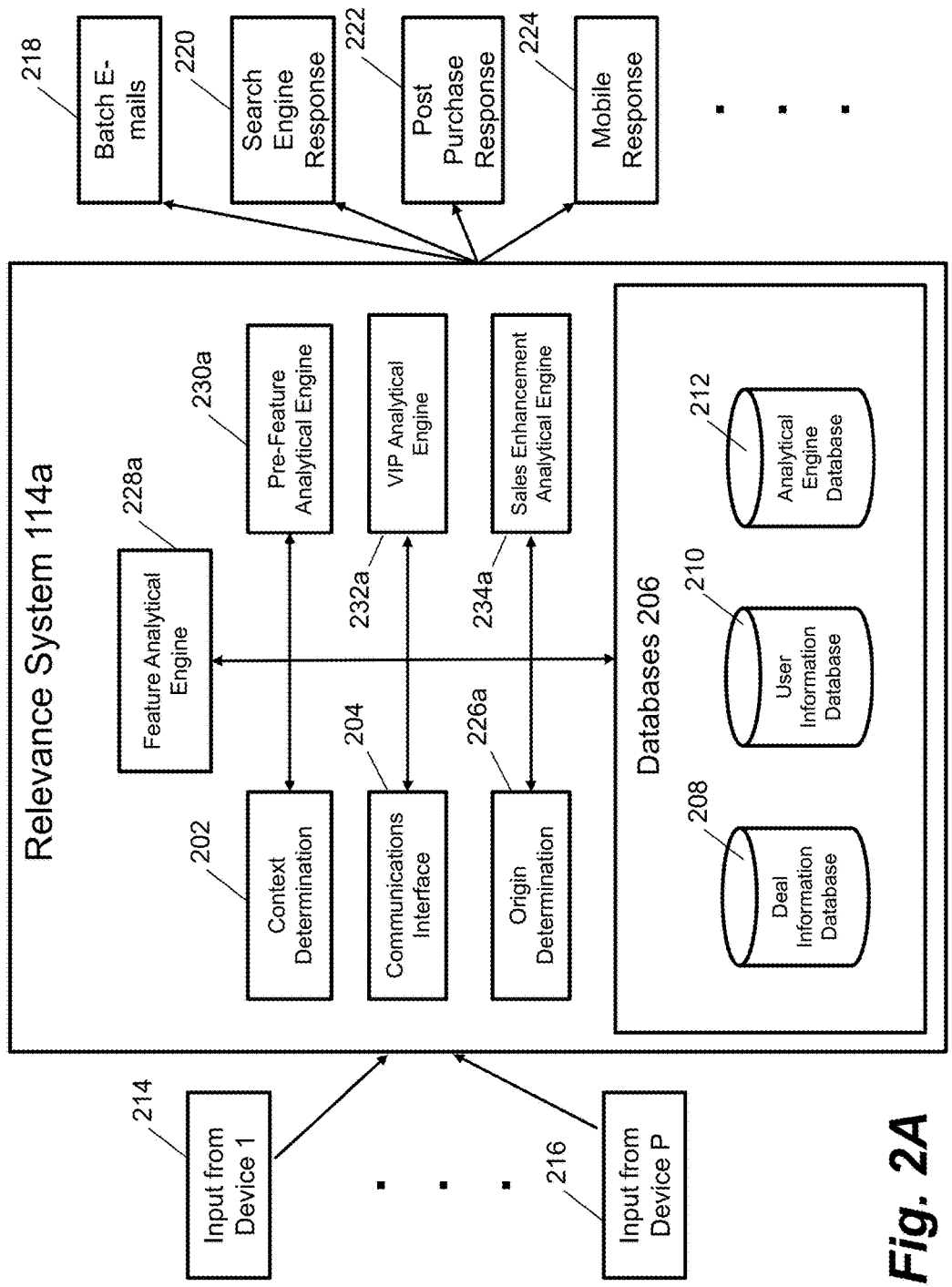
FIG. 2A shows a block diagram of the relevance system.

FIG. 2A illustrates a block diagram of the relevance system 114a. As illustrated in FIG. 2A, the relevance system 114a can receive inputs from one or more input devices, such as input from a device 1 (214) to input from a device P (216). Examples of input devices include, but are not limited to, input from the Groupon® server 112, the search engine system 116, the 3rd party server 118, and the consumer 1 (104) through the consumer N (106).

As shown in FIG. 2A, the relevance system 114a includes a feature analytical engine 228a (e.g., see U.S. patent application Ser. No. 13/411,502), a pre-feature analytical engine 230a, a VIP analytical engine 232a, a sales enhancement analytical engine 234a, context determination 202, origin determination 226a, a communications interface 204, and databases 206. FIG. 2A depicts multiple analytical engines in order to issue and process pre-feature deals, VIP deals, feature deals, and sales enhancement deals. Alternatively, the relevance system may include a single analytical engine in order to perform this functionality.

In an embodiment, the relevance system 114a may optionally use the context determination 202 and the origin determination 226a in order to process multiple workflows depending on context and origin, respectively. As shown in FIG. 2A, the context determination 202 and the origin determination 226a are configured to control the flow of the various workflows and are illustrated as separate from the various analytical engines 228a, 230a, 232a, and 234a. Alternatively, the context determination 202 and the origin determination 226a may be integrated with the analytical engines 228a, 230a, 232a, and 234a. Further, as shown in FIG. 2A, the databases 206 include deal information database 208, user information database 210, and analytical engine database 212. The deal information database 208 includes data related to the deal programs available for offer to users. The user information database 210 includes, without limitation, data related to the users, such as merchants, consumers, and subscribers. Also, the analytical engine database 212 may include data (other than deal program data and user data) that is used by the analytical engines 228a, 230a, 232a, 234a, such as a data from a past purchases database. Further, FIG. 2A separately depicts the deal information database 208, the user information database 210, and the analytical engine database 212. Alternatively, the information depicted in the deal information database 208, the user information database 210, and the analytical engine database 212 may be included in a single database.

Figure 2B:
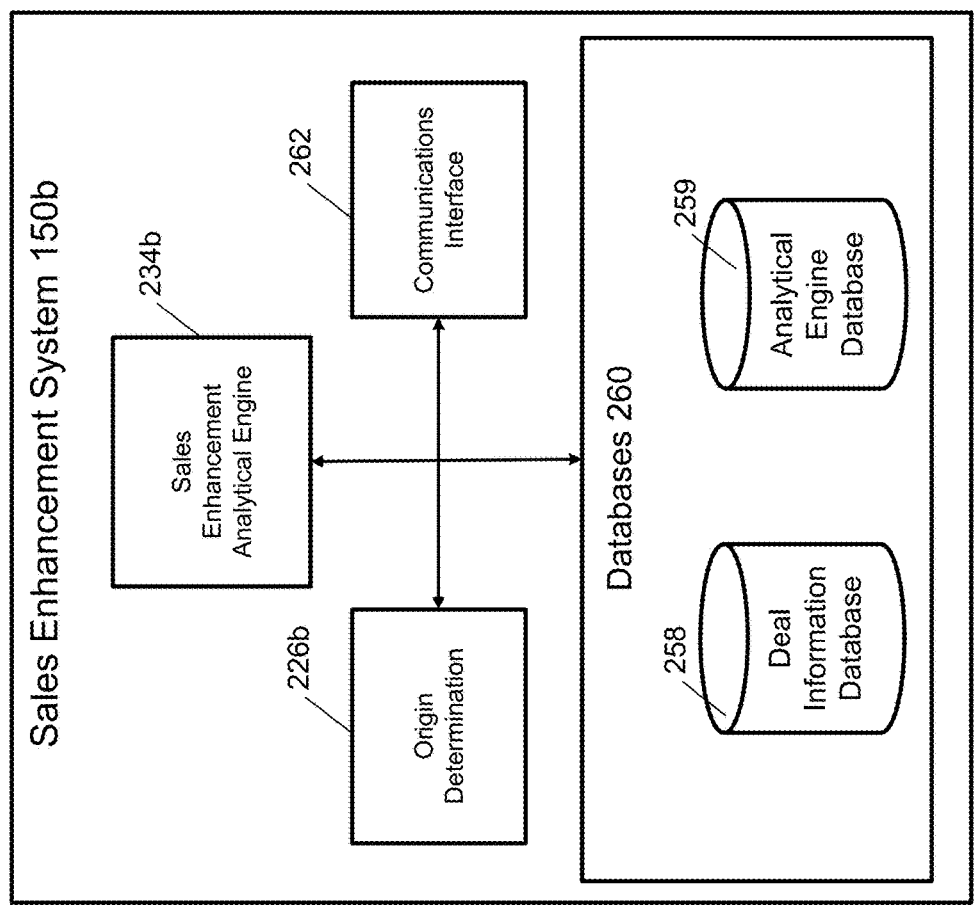
FIG. 2B shows a block diagram of the sales enhancement system.

As discussed above, the relevance system 114a may include various analytical engines for managing the different deal programs, including the pre-feature deal programs, the VIP deal programs, the feature programs, and the sales enhancement deal programs. Alternatively, the functionality for managing the different deal programs may be separated from the relevance system. FIG. 2B illustrates a block diagram of the sales enhancement system 150b, which is an example of the functionality for managing sales enhancement deal programs. The sales enhancement system 150b may include a sales enhancement analytical engine 234b, origin determination 226b, a communications interface 262, and databases 260. In an embodiment, the sales enhancement system 150b may optionally use the origin determination 226a in order to process multiple workflows depending on the origin of a deal program. As shown in FIG. 2B, the origin determination 226b is separate from the sales enhancement analytical engine 234b, and the determination and engine can be used to control the flow of the various workflows. Alternatively, the origin determination 226b may be integrated with the sales enhancement analytical engine 234b. Further, as shown in FIG. 2B, the databases 260 may include a deal information database 258 and an analytical engine database 259. The deal information database 258 includes data related to the deal programs available for offer to users. Also, the analytical engine database 259 may include data (other than deal program data) that is used by the sales enhancement analytical engine 234b, such as data from a past purchases database. Further, FIG. 2B depicts the deal information database 258 and the analytical engine database 259 as separate databases. Alternatively, these databases may be included in a single database and in a single memory device. Though not depicted in the figures, VIP system 144b, pre-feature system 146b, and feature system 148b may include similar structure as depicted in FIG. 2B.

Figure 3:
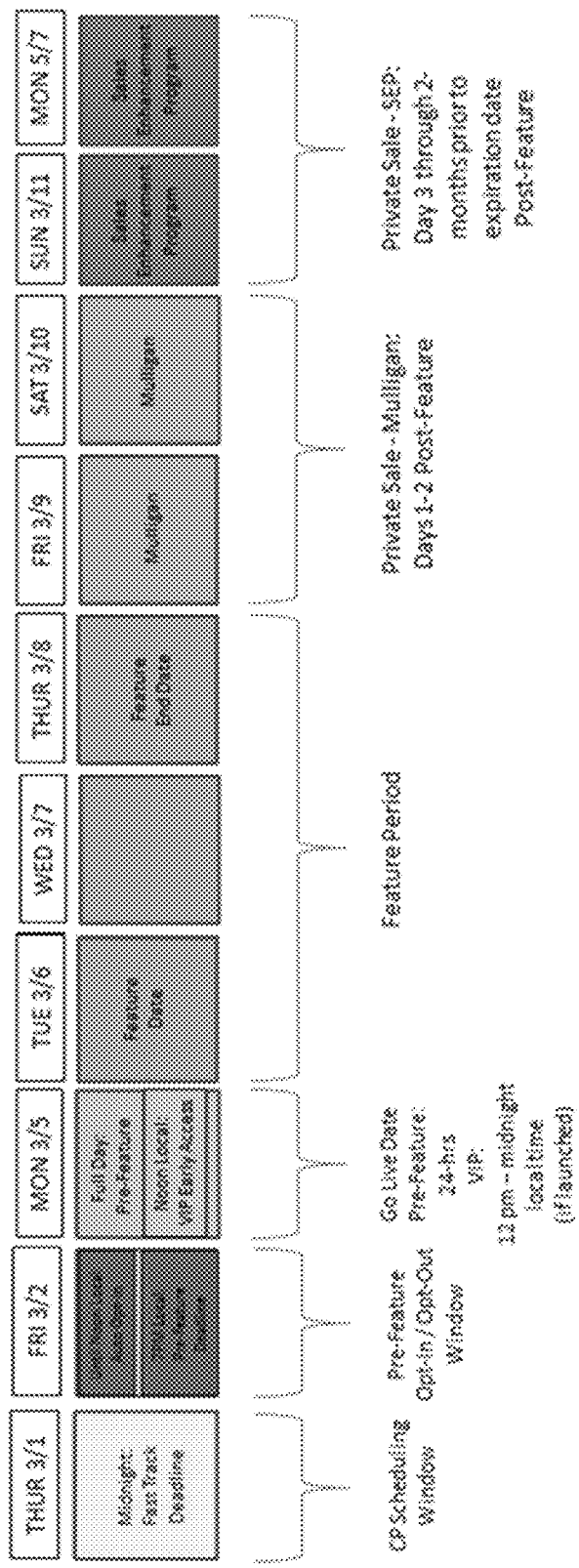
FIG. 3 illustrates a deal program life cycle.

FIG. 3 illustrates an example of a deal program life cycle 300, in which different periods of the deal program are illustrated. The different periods of the deal program life cycle 300, the ordering of the different periods, and the length of time for the different periods are for illustration purposes.

The deal cycle may have one or more scheduling periods, such as CP scheduling window. Further, the deal cycle may have one or more opt-in/opt-out window in which to opt-in or opt-out of one or more of the periods. For example, FIG. 3 illustrates an opt-in/opt/out window for the pre-feature period, which is discussed below.

FIG. 3 illustrates different periods for the promotion program, including the pre-feature period, feature period, VIP period, post-feature period, and private sale. The pre-feature period is designed to generate test data in order to test or investigate at least one attribute associated with the promotion program. The pre-feature period is discussed in U.S. Provisional Application No. 61/593,262, filed on Jan. 31, 2012, entitled Pre-Feature Promotion System, and U.S. application Ser. No. 13/756,145, filed on Jan. 31, 2013, entitled Pre-Feature Promotion system, both of which are incorporated by reference herein in their entirety. The pre-feature period may implement the promotion program with one or more predetermined attributes in order to generate the test data. For example, multiple consumer groupings may be based on distance of the consumer to the test promotion (i.e., 0-2 miles from the location of the promotion, 2-4 miles from the location of the promotion, etc.). The multiple consumer groupings may also be based on attributes of the consumers, such as gender, age, economic status, or the like.

As discussed in more detail below, the promotion offering system 102 is configured to select consumers for the pre-feature promotion so that the consumers selected in the multiple groupings exhibit a pre-determined distribution of values for the tested attribute. In this way, the consumers selected represent a control population that exhibit the pre-determined distribution of values.

The feature period may be similar to the pre-feature period in certain aspects, and vary from the pre-feature period in other aspects. Likewise, data generated from the pre-feature period may be used to determine which consumers to target during the feature period, as discussed in U.S. Provisional Application No. 61/593,262. As one example, the pre-feature period may run prior to the feature period (such as the day before the full-feature promotion, as illustrated in FIG. 3).

As one example, the deal features for the deal program during the pre-feature period and the feature period may be the same, whereas the relevance features of the pre-feature period and its corresponding feature period may be different. In particular, the pre-feature period and the corresponding feature period may identify common deal features, such as the same merchant for the deal, the same amount of the discount, etc. Moreover, the implementation of the deal program during the pre-feature period may be different from the feature period in one or more aspects. For example, the relevance features may be different during the pre-feature period than during the feature period, so that the number of consumers targeted and the set of consumers targeting (such as the distribution of consumers targeted, etc.) are different during the pre-feature period and during the feature period. In the geographic example described above, the pre-feature period may target 3,000 consumers in each of the values of geographic distance (0-2 miles, 2-4 miles, etc.). So that, the pre-feature period targets a predetermined distribution (such as consumers in a pre-determined geographic distribution).

In implementing the corresponding feature period, a greater number of consumers may be targeted (e.g., the number of consumers targeted may be an order of magnitude higher than that targeted in the pre-feature period, such as 30,000), and a different distribution of consumers for a particular grouping may be targeted (such as focusing on consumers 2-4 miles from the promotion, instead of selecting representative consumers in each of the values of geographic distance). So that, when sending an offer for the deal program to the consumer (such as in a daily email), the consumer may be selected based on criteria different from selecting the consumer during the pre-feature period.

Further, accessibility to a deal may be different in the pre-feature period than in the feature period. The deal may be accessible by a consumer in the pre-feature period only if the consumer received a communication (such as an email) that includes a link to purchase the deal. So that, the deal is not accessible without the communication. In contrast, the deal in the feature period may be accessible by all consumers. For example, the consumers may access Groupon server 112 in order to view and purchase the deal during the feature period. In this way, the availability of the deal to the public is different in the pre-feature period than in the feature period.

FIG. 3 also illustrates a VIP period. The VIP period has the same deal features used during the pre-feature period and the feature period. However, the VIP period is dissimilar to the pre-feature period and the feature period in that the relevance features are different. In particular, the VIP period enables customers with a particular attribute (e.g., a status designation as a VIP) to access and/or purchase the deal. In one embodiment, all customers may access the deal program during the VIP period, but only customers with a VIP designation can purchase a deal during the VIP period. In an alternate embodiment, only customers with a VIP designation can access and purchase a deal during the VIP period. In this way, the VIP period is dissimilar to the feature period in that only a subset of the customers (e.g., the VIP customers) can access and/or purchase a deal from the deal program during the VIP period whereas all customers can access and purchase a deal from the deal program during the feature period.

FIG. 3 further illustrates a mulligan period. The mulligan period is for a predetermined time beginning after or at the end of the feature period. As shown in FIG. 3, the mulligan period is the two days after the feature period, with the feature period end date March 8 and the mulligan period being March 9 and March 10. For example, the offer communicated to the customer may include a link (such as a hyperlink) to a datapage, as discussed above. During the feature period, the datapage may be accessed by means other than activation of the link. For instance, the Groupon server 112 may store the datapage, with a designation during the feature period of being publicly available so that the datapage is searchable (e.g., a publicly available period in which any customer may search the server with results of the search indicating the datapage). During the mulligan period, the datapage is no longer publicly accessible (e.g., a link-activation period, which is a period after the publicly available period and in which the datapage is only accessible via the server by activating the link).

The purpose for the mulligan period is to allow consumers who may have missed the opportunity to purchase the deal during the feature period to still be allowed to purchase the deal if the consumer still has access to the communication that includes the link. As discussed above, the consumer may purchase the deal during the feature period in one of several ways, including purchasing the deal by searching the Groupon server 112 or by accessing a link (included in an email) to purchase the deal. In the event the customer has not accessed the link during the feature period, the mulligan period enables the customer to activate the link to purchase the deal. So that, even if the deal is no longer publicly available on the Groupon server 112 after the feature period, the customer may still purchase the deal.

In addition, FIG. 3 further illustrates a sales enhancement period. The sales enhancement period may be performed using the sales enhancement system discussed herein. The sales enhancement period, as implemented by the sales enhancement system, is dissimilar to the feature period in one or more ways. First, the deal program may be publicly available during the feature period and may not publicly available during the sales enhancement period. Second, the triggering event(s) under which a deal is offered to a consumer is different in the feature period than in the sales enhancement period. As discussed below, the sales enhancement system transmits an offer for a deal in response to one or more triggering events, such as disclosed in FIGS. 4A-4B. In contrast, a deal may be transmitted to a customer during the feature period using a different triggering event. For example, a customer may be designated as receiving a periodic email (such as a daily email) with a deal. So that, the triggering event may comprise a periodic event, such as transmitting the periodic email. The deal(s) included in the periodic email may be selected from deal programs that are currently in the feature period.

Further, the periods of the deal program have a start time/date, an end time/date, and a length of time between the start time/date and end time/date, such as shown in FIG. 3. For example, the VIP period is illustrated in FIG. 3 as starting on March 5 at noon, ending on March 5 at midnight, and with a length of 12 hours. Similarly, the pre-feature period is illustrated in FIG. 3 as starting on March 4 at midnight, ending on March 5 at midnight, and with a length of 24 hours. In one embodiment, the periods of the deal program life cycle 300 may have the same start time/date, the same end time/date, and/or the same length of time between the start time/date and the end time/date. In an alternate embodiment, the periods of the deal program life cycle 300 may have different start time/dates, different end time/dates, and different lengths of time between the start time/date and the end time/date. Further, the periods of the deal program life cycle 300 may at least partly overlap one another. For example, the VIP period overlaps with the pre-feature period, as shown in FIG. 3.

Figure 4A:
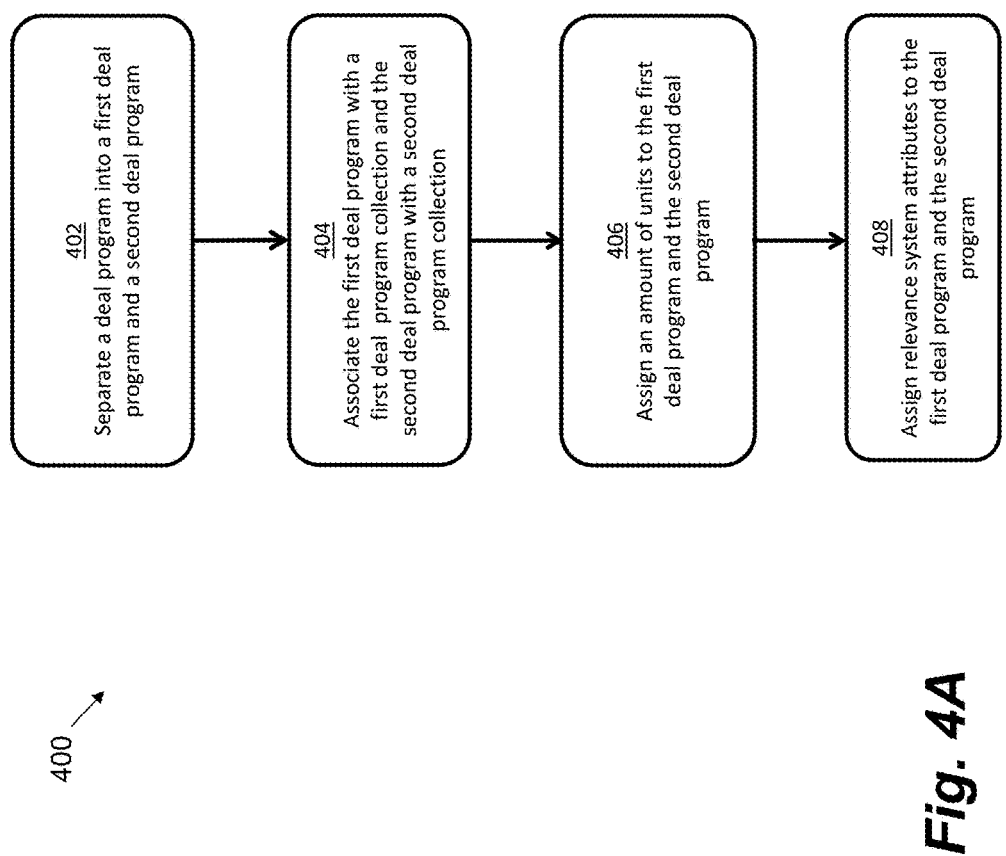
FIG. 4A illustrates a flow diagram for separating a deal program into different deal program collections.

FIG. 4A illustrates an example method 400 for associating one or more deal programs into different groupings or different collections. In one embodiment, a deal program (which includes deal attributes) may be separated into multiple deal programs, such as a first deal program and a second deal program (each with the same deal attributes), as shown at 402. The first deal program and the second deal program may then be associated with a first deal program collection and a second deal program collection, respectively, as shown at 404. Further, at 406, an amount of units may be assigned to the first deal program and the second deal program. For example, and described in more detail below, the amount of units assigned to each program may occur through one or more workflows, including a new deal workflow, a returns workflow, a breakage workflow, a purchased inventory workflow, a now deal workflow (where a "now deal" refers a deal program that provides a specific number of units for a specific amount of time, where the use of each unit is conditioned on at least a consumer using the unit within specific period of time), a perpetual deal workflow, a channel deal workflow, a national deal workflow, or a local deal workflow. Finally, at 408, relevance attributes (e.g., relevance features or criteria) may be assigned to the first deal program and the second deal program. Also, one distinction between a "new deal" and a "now deal" is that a purpose of a "new deal" may be to promote a merchant, where the purpose of a "now deal" is usually to clear inventory, such as clearing a surplus of goods or clearing unreserved tables at a restaurant.

By separating and associating deal programs and respective components of deal programs into different groupings or collections, the different systems, such as the relevance system, the VIP system, the pre-feature system, the feature system, and/or the sales enhancement system have the option to treat each grouping or collection differently. Therefore, because each grouping or collection may be treated differently (e.g., the pre-feature deal program compilation, the VIP deal program compilation, the feature deal program compilation, and the sales enhancement program compilation), the various systems may provide the deal programs associated with a particular grouping or collection for different periods of time, such as a longer period of time, than other units.

In one embodiment, for example, a deal program provider may determine to reserve 80% of a deal program's units for a first deal program collection (such as the feature deal program collection), and 20% for a second deal program collection (such as the sales enhancement deal program collection). Also, instead of arbitrarily assigning units, in another embodiment, units may be added to or restricted from a grouping or collection based on historical information, e.g., information related to an amount of units already sold for a deal program. For example, after the deal provider sells 80% of a deal program's units, the provider may add an additional 20% of units to the deal program. In such a case, the additional 20% of units may be associated with a second deal program collection. In still another embodiment, units may be added to or restricted from a grouping or collection based on a predetermined period to purchase or use a unit (e.g., two days, one week, one month, indefinite), and a capability to dynamically change the predetermined period to purchase or use a unit, based on historical or real-time information. Such historical or real-time information may include, but is not limited to, information pertaining to product or service categories, groups of consumers, a real-time location of a consumer, residence of a consumer, or marketing channels related to the deal program features. The product or service categories may include, but are not limited to, books, audio and/or video recordings, housewares and home repair services, groceries and food related services, health and beauty goods or services, toys and child care services such short term care, clothing, sporting goods and outdoor activities and services, automotive or industrial goods and services, and electronics and appliances and related maintenance services.

So that, the number of units assigned to the first deal program (such as the feature deal program) and the second deal program (such as the sales enhancement deal program) may be determined in a variety of ways. As one example, if the first deal program does not have a cap or an upper limit on the units, and if 100 units are sold during the feature period (the period during which deals are offered from the first deal program, a predetermined percentage (such as 20%) of the units sold from the first deal program are assigned to the second deal program (such as the sales enhancement deal program). As another example, if the first deal program (such as the feature deal program) has a cap or an upper limit on the units (Y units), and if X units are sold during the feature period, Y-X units are assigned to the second deal program (such as the sales enhancement deal program). As still another example, if the first deal program (such as the feature deal program) does not have a cap but only sells X units, a predetermined percentage of the X units are assigned to the second deal program (such as the sales enhancement program).

Figure 4B:
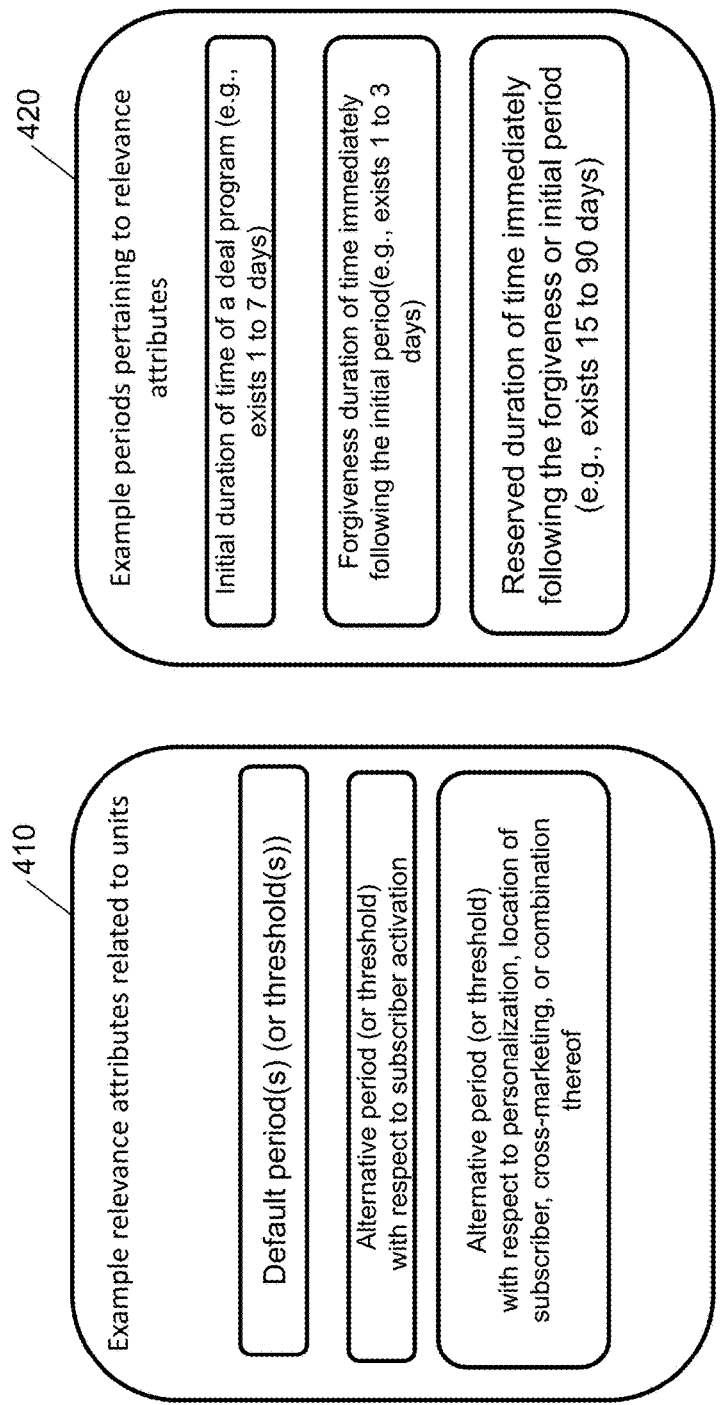
FIG. 4B illustrates example relevance attributes and example periods pertaining to the relevance attributes.

FIG. 4B illustrates example relevance attributes pertaining to units 410, which includes, without limitation, default period(s) of time (e.g., a default period of time a unit is available for purchasing or a unit can be used, and alternative period(s) of time with respect to subscriber activation or with respect to personalization, location of the subscriber, cross-marketing, or a combination thereof. FIG. 4B further illustrates examples of predetermined periods pertaining to relevance attributes 420, such as an initial period for a deal program, a forgiveness period, and a reserved period for restricting the availability of units. As discussed above, the relevance attributes and the example periods pertaining to the relevance attributes may differ for the first deal program (associated with the first deal program collection) and the second deal program (associated with the second deal program collection). In this way, even though the first deal program and the second deal program have the same deal attributes, other attributes of the respective deal programs differ, such as the relevance attributes and the time periods associated with the relevance attributes.

Figure 4C:
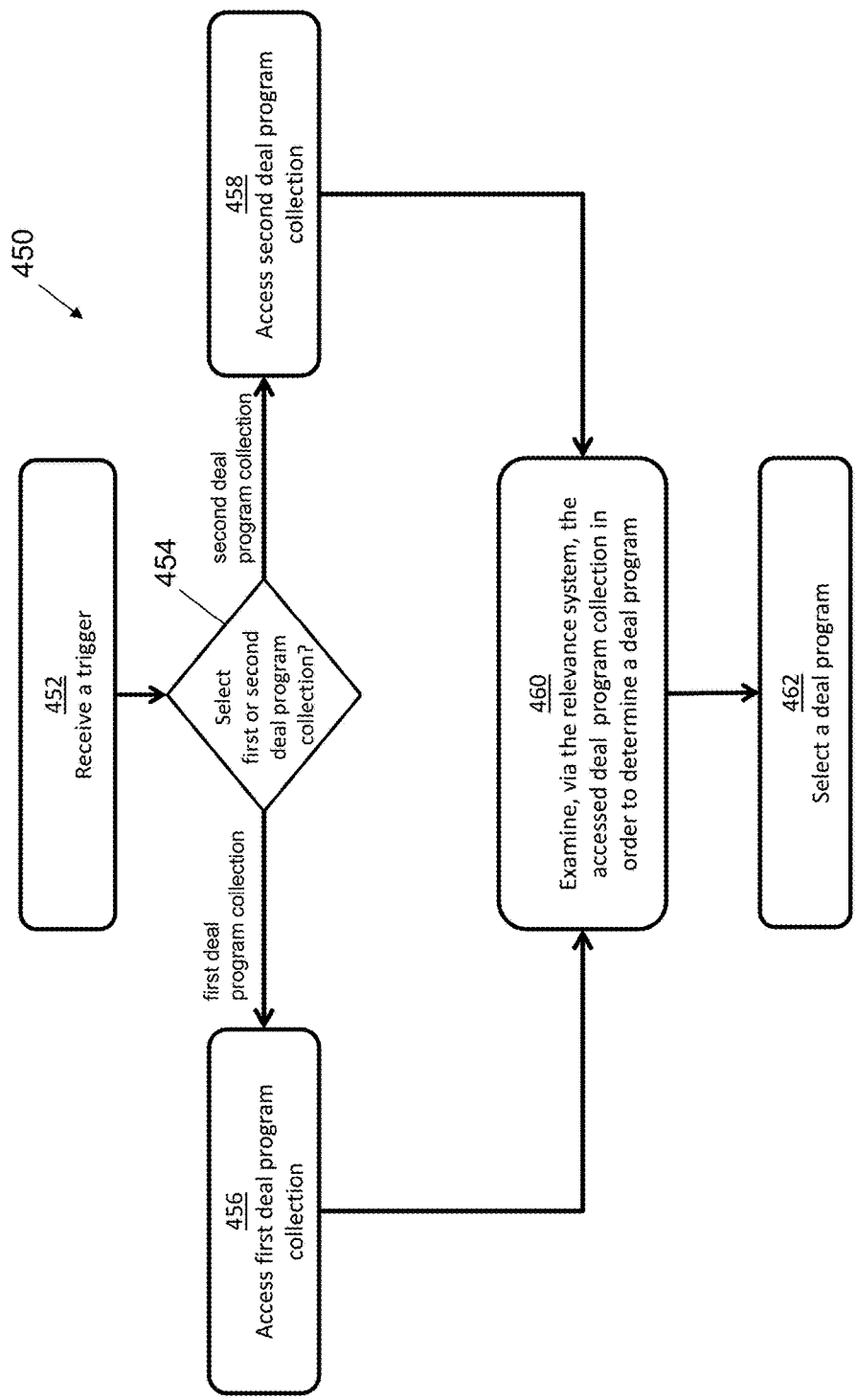
FIG. 4C illustrates a flow diagram for using a trigger to determine which deal program collection to access.

FIG. 4C illustrates an example method 450 for selecting a deal program collection. At 452, a trigger is received. Different triggers include, but are not limited to the above-mentioned triggers, such as determining that none of the scores for the deal programs in a first deal program collection meets a predetermined threshold. At 454, based on the trigger received, the first deal program collection or second deal program collection is selected. If the first deal program collection is selected, at 456, the first deal program collection is accessed. If the second deal program collection is selected, at 458, the second deal program collection is accessed. After which, at 460, the relevance system examines the accessed program deal program collection in order to determine what to send to the consumer (such as an impression or an offer for a deal). At 462, the relevance system selects a deal program in order to transmit to the consumer an offer for a deal from the deal program.

A trigger may depend on the type of request received. For example, a request by a consumer for a deal from a website, such as Groupon® server 112, may trigger a selection of one of the deal program collections. As another example, a request by a consumer for an acceptance or use of a deal within a predetermined time period, such as acceptance or use of the deal in less than one day (or less than 3 hours), in one to five days, may trigger a selection of one of the deal program collections. As still another example, a request for a deal from a third party, such as search engine system 116 utilizing search engine marketing, may trigger a selection of one of the deal program collections. The request from the search engine system 116 may include an indication that a user (e.g., potential consumer) selected a link from a list of Internet search results. As still another example, the trigger may comprise receiving a request for a deal program utilizing an online advertising channel. For example, the request of the trigger can include an indication that a user selected a link in an advertisement on a webpage, where the content of the webpage and the advertisement relate to each other (e.g., advertisement for sporting goods on a sports news webpage). Further, the trigger may include receiving a request for a deal program associated with a syndication partner. For example, the request of the trigger can include an indication that another deal provider partnered with the deal provider has sent the request.

FIG. 4D describes additional triggers, including, without limitation, receiving a request for a deal program, which requests selection of a deal program based on attributes related to a deal program or units, consumer or subscriber status, measurable historical activity of the consumer or subscriber, status or quality of a merchant, measurable historical activity of the merchant, any parameter or condition measured or analyzed by the relevance system, and location of the source of the request, such as the location of the user making the request or with respect to location in a source webpage, email, SMS text, or voicemail.

Figure 5:
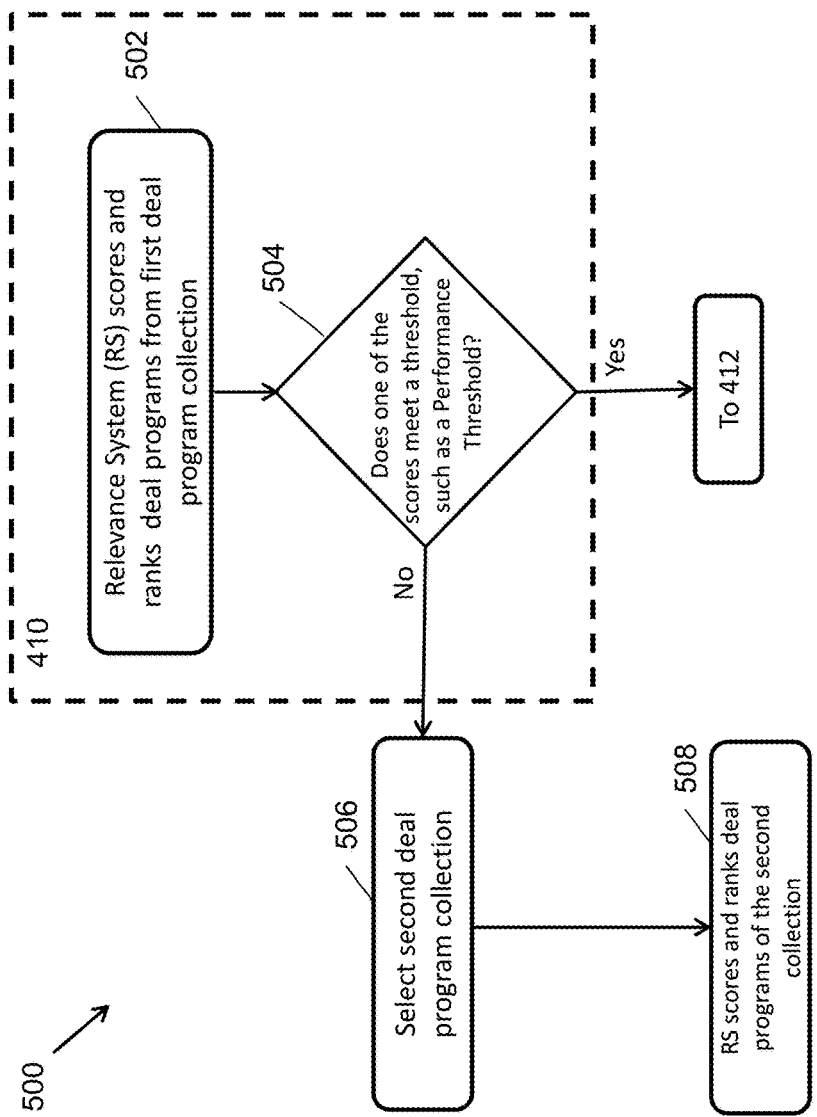
FIG. 5 illustrates a flow diagram for selecting a deal program once a collection has been selected.

FIG. 5 is an example method 500 for a trigger to select a deal program collection, in which a second deal program collection is selected after a first deal program collection has been selected. The method 500 expands on 460 of FIG. 4C, where the relevance system examines the accessed deal program collection in order to determine what to send to the consumer. At 502, the relevance system scores and ranks a deal program of the selected deal program collection. The score may be indicative of a prediction that a consumer will accept a deal that is offered. The indication of acceptance of the deal may take one of several forms, such as the conversion rate (the rate by which a user accepts a deal that is offered or the number of purchases of the deal divided by the number of times the deal is offered to users) or another type of relevance score. At 504, the relevance system determines whether one of the scores of a deal program from the first deal program collection meets a predetermined threshold, such as a minimum score. If none of the scores of the deal program of the first collection meets or exceeds the threshold, at 506, the second deal program collection is selected. As discussed above, one example of a trigger to select a particular deal program collection is the failure to find a deal from a deal program in another deal program collection with a sufficient score. At 508, the relevance system scores and ranks the deal program of the second collection at 506.

Another example of a trigger for selection of a deal program collection includes receiving a request for a deal from a new customer. One deal program collection, such as the long term deal program collection, may have a greater number of deal programs associated with it. The greater number of deal programs may increase the likelihood of finding a deal from a deal program in the collection with a higher conversion rate (or likelihood that the new customer will purchase the deal offered). For example, the system will be more likely to find an acceptable deal to offer from a deal program collection with 10,000 deals rather than a deal program collection with 100 deals. The system may determine in one of several ways whether a request for a deal is from a new user. In response to the determination, the system may access a specific one of the deal program collections. In this way, in response to the system determining that a request for a deal is from a new customer, the system may access the particular deal program collection (such as the long term deal program collection).

Yet another example of a trigger for selection of a deal program collection includes a potential upsell to a customer. Upselling is a technique by which to induce a customer to purchase an upgrade or add-on. In one embodiment, in response to a customer purchasing a deal, the sales enhancement system may determine the potential for an upsell to the customer. In response to the determination, the sales enhancement system may access one of the deal program collections in order to offer a second deal. The second deal may be related to the deal recently purchased by the customer. Alternatively, or in addition, the second deal may have a high conversion rate in the interest of enticing the customer to purchase the second deal. In a more specific embodiment, in response to a customer purchasing a deal from a particular deal program collection (such as the first deal collection), the sales enhancement system may determine the potential for an upsell to the customer from a different deal program collection (such as the second deal collection) by searching the different deal program collection for a related deal and offering the related deal to the customer. For example, if the customer purchases a deal from a first program collection (which may include deals that are in the feature period), the sales enhancement system may select a deal from the second deal program collection to offer to the consumer.

Still another example of a trigger for selection of a deal program collection includes sending a batch email. A set of consumers may be designated to receive an email at predetermined intervals, such as daily. The email for the set of consumers may be sent in a batch and may include one or more offers for deals that are selected based on one or more attributes of the respective consumer. In preparation for sending the batch email, one of the deal program collections may be selected. After which, the deal programs in the selected deal program collection may be analyzed in order to determine which deal program to offer the respective consumer in the email.

Yet another example of a trigger for selection of a deal program collection includes a request for a deal responsive to search engine marketing. For example, the consumer may input search terms into a search engine in order to search for a particular deal, such as a sushi deal. The search terms may be in the form of a text query. The search engine displays the results of the search. Typically, the search engine has certain keywords, such as "sushi," that is mapped to an advertisement group, such as "sushi deals." The advertisement group is then used to display an ad. If the consumer clicks on the ad, the search engine may send the advertisement group and the general location of the user (as determined by the search engine) to the relevance system. In turn, the relevance system may map the advertisement group to a category or subcategory. For example, the advertisement group "sushi deals" may be mapped to the subcategory "sushi restaurants". In response to receiving the communication from the search engine, a specific deal program collection may be selected. In particular, the long term deal program collection, with the large number of deal programs associated therewith, may be used to respond to the communication from the search engine.

Still another example of a trigger comprises whether the customer has requested acceptance for an expired deal. As discussed above, when an offer is sent to a customer, the customer is notified of a predetermined amount of time in which to accept the offer. If the customer attempts to accept the offer after the notified predetermined amount of time in which to accept the offer (such as two days after sending an offer for a deal), the request for purchase of an expired deal may be considered a trigger for a particular deal collection. In particular, if the deal offered to the customer is the first deal program in the first deal program collection, and if the customer attempts to accept the offer after the expiration of the offer and/or after the expiration of the period during which offers may be made by the first deal program, the sales enhancement system is configured to treat the request for accepting an expired deal from the first deal program (in the first deal program collection) as a trigger to search for another deal program in the second deal program collection (e.g., to determine whether the second deal program collection has the second deal program, which has the same or similar deal attributes as the first deal program). So that, even if the offer for a deal from the first deal program has expired, the customer may still accept the offer (if the sales enhancement system has located the second deal program in the second deal program collection with the same deal features as the first deal program).

Aside from threshold values, the relevance system or the sales enhancement system may assign to a deal program features that include, without limitation, an indication of deal programs that relate to each other, an expected shelf life of a unit (e.g., a duration of time in which a unit sells at a predetermined acceptable rate), an expected quantity of units sold per deal program, an expected revenue per deal program, a margin per unit of a deal program, and an expiration date of units of a deal program. Each one of these features may be used on its own or as a factor to determine the rankings of deal programs.

Figure 6A:
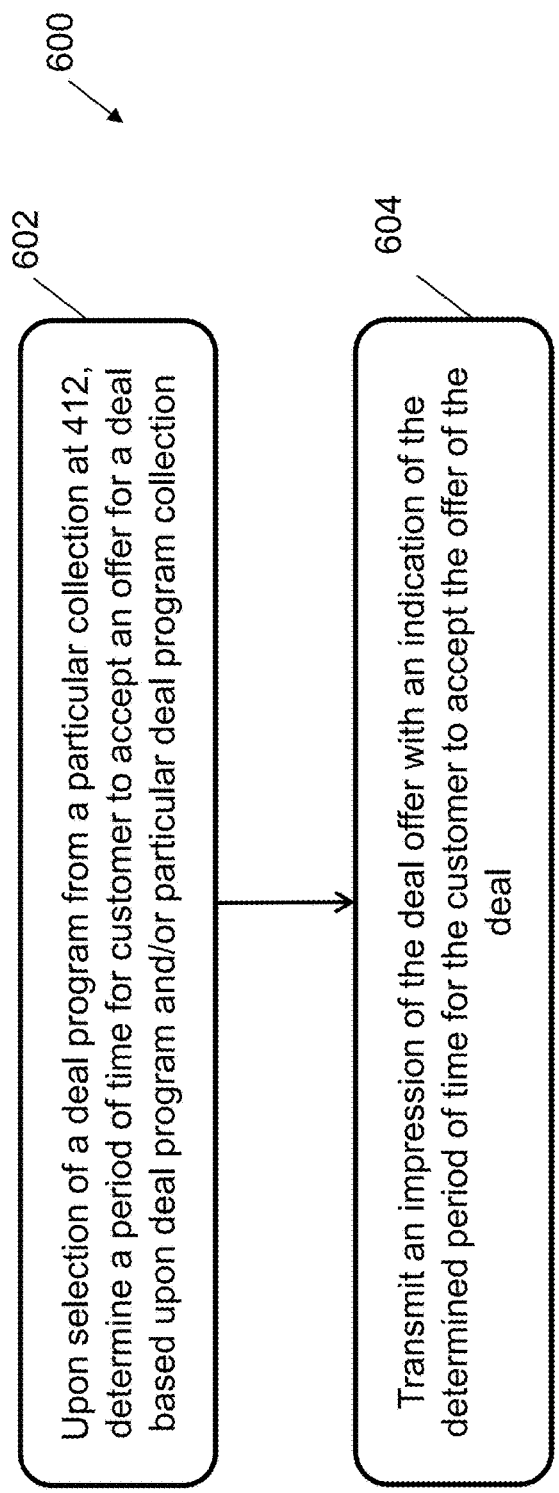
FIG. 6A illustrates a flow diagram for selecting the period of time to accept an offer for a deal.

FIG. 6A illustrates an example method 600 for transmitting an impression of a deal program. At 602, upon selection of a deal program from a particular collection at 462, determine a period of time for consumer to accept an offer for a deal based upon deal program and/or particular deal program collection. As discussed above, the time period for the consumer to accept an offer may be an attribute of the deal program or may be an attribute of the deal program collection that the deal program is associated with. After determining the period of time for the consumer to accept the offer, at 604, an impression of a deal offer is transmitted with an indication of the determined period of time for the consumer to accept the offer of the deal.

Figure 6B:
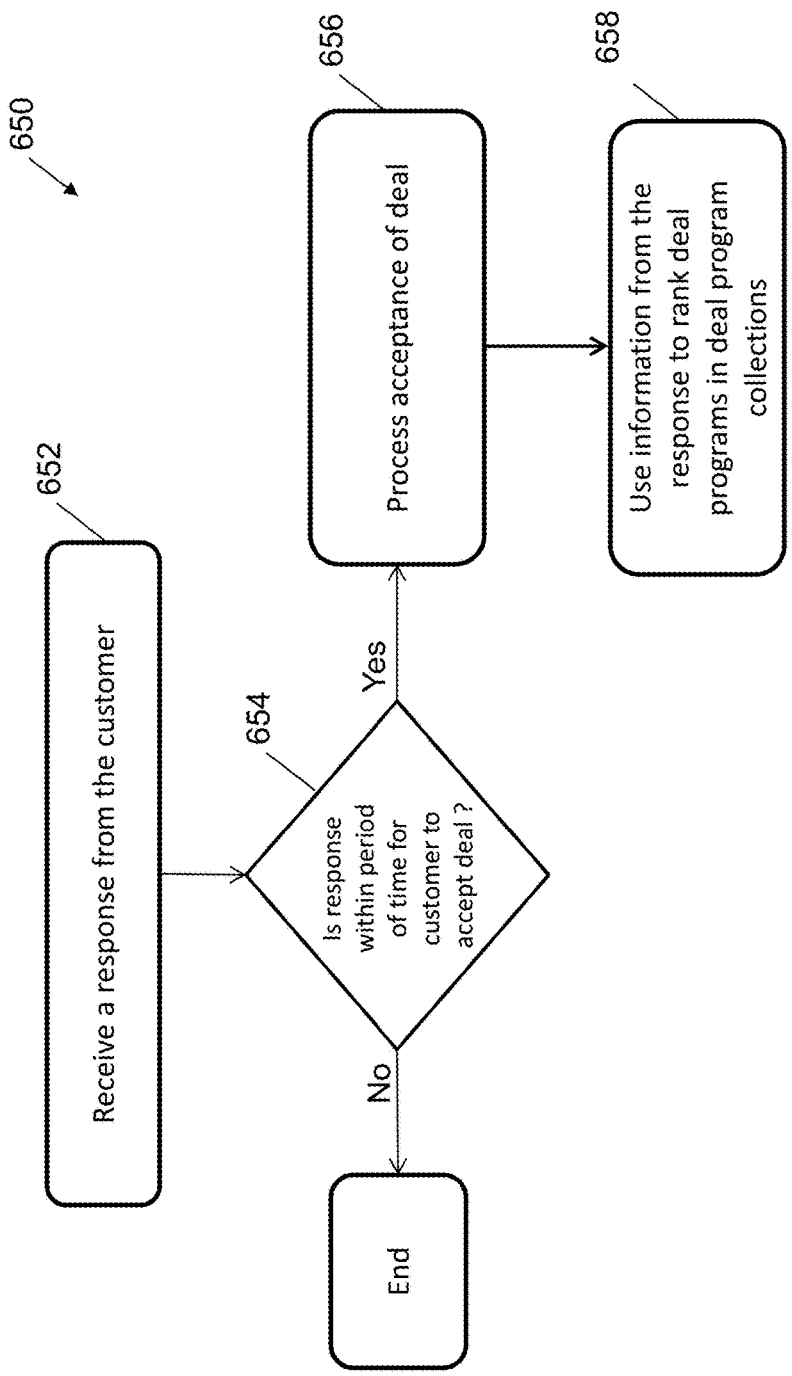
FIG. 6B illustrates a flow diagram for receiving a response from the consumer and determining if the response is within the time period of accepting an offer for a deal.

FIG. 6B illustrates an example method 650 for processing a received response. At 652, the response is received. In one aspect, the response may include an indication of acceptance of the offer. At 654, it is determined whether the response was received within the time period for the consumer to accept the offer. If so, at 656, the acceptance of the deal is processed. After which, at 658, the information in the response may optionally be used to rank deal programs in the deal program collections. In particular, information in the response (such as an amount of units purchased, a date and time of purchase, and/or a location of the consumer during purchase) may be used as a factor in ranking deal programs of a deal program collection.

An impression store may be used to determine whether the response was received within the time period for the consumer to accept the offer. As discussed above, a deal program may have different periods of time associated with it, such as a period during which deals may be offered from the deal program and such as a period in which a consumer may purchase or accept the deal after receipt of the offer. So that, after the deal is offered to the consumer, the consumer has a predetermined period of time (such as 1 or 2 days) in which to purchase or to accept the deal after transmittal of the offer. This period of time for acceptance may be different that the period of time during which deals may be offered from the deal program.

The impression store may be used to track the impressions or offers sent to consumers. The impression store may be stored, for example, in user information database 208. The impression store may track impressions by storing the following three items: an identifier of the consumer that received the offer (or impression) (such as an email address, telephone number, etc.); an identification of the deal program subject to the offer; and a time when the offer was transmitted (or when the consumer first viewed the offer). Optionally, the impression store may store the context of the impression (such as whether the offer was transmitted in an e-mail, a website communication, etc., when the offer was issued relative to the life cycle of the deal program (e.g., at the beginning of the time period when the deal program offered deals, at the end of the time period when the deal program offered deals, etc.).

The impression store may comprise a nested hash structure or a relational database. The information in the impression store may be used in one of several ways. First, the information may be used to determine whether a deal is still available to the consumer for purchase or acceptance. If the time when the offer was transmitted (or first viewed) is less than the time period in which to accept the offer (such as 2 days), the consumer may still accept the deal. If the time when the offer was transmitted (or first viewed) is more than the time period in which to accept the offer (such as 2 days), under certain circumstances, the consumer may not accept the deal. Alternatively, in the event that the consumer wishes to accept an offer that is outside of the time period in which to accept the deal offer, an alternative period, such as the forgiveness period, discussed above, may give the consumer an extended time period in which to accept the offer.

Second, the impression store may track the impressions or offers for deals transmitted to the consumers. In particular, the impression store may identify which consumers have seen what offers for a product/service and when (and potentially which what offers have been accepted). In this way, the relevance system may access the impression store in order to avoid offering the same product/service in the future.

Figure 7:
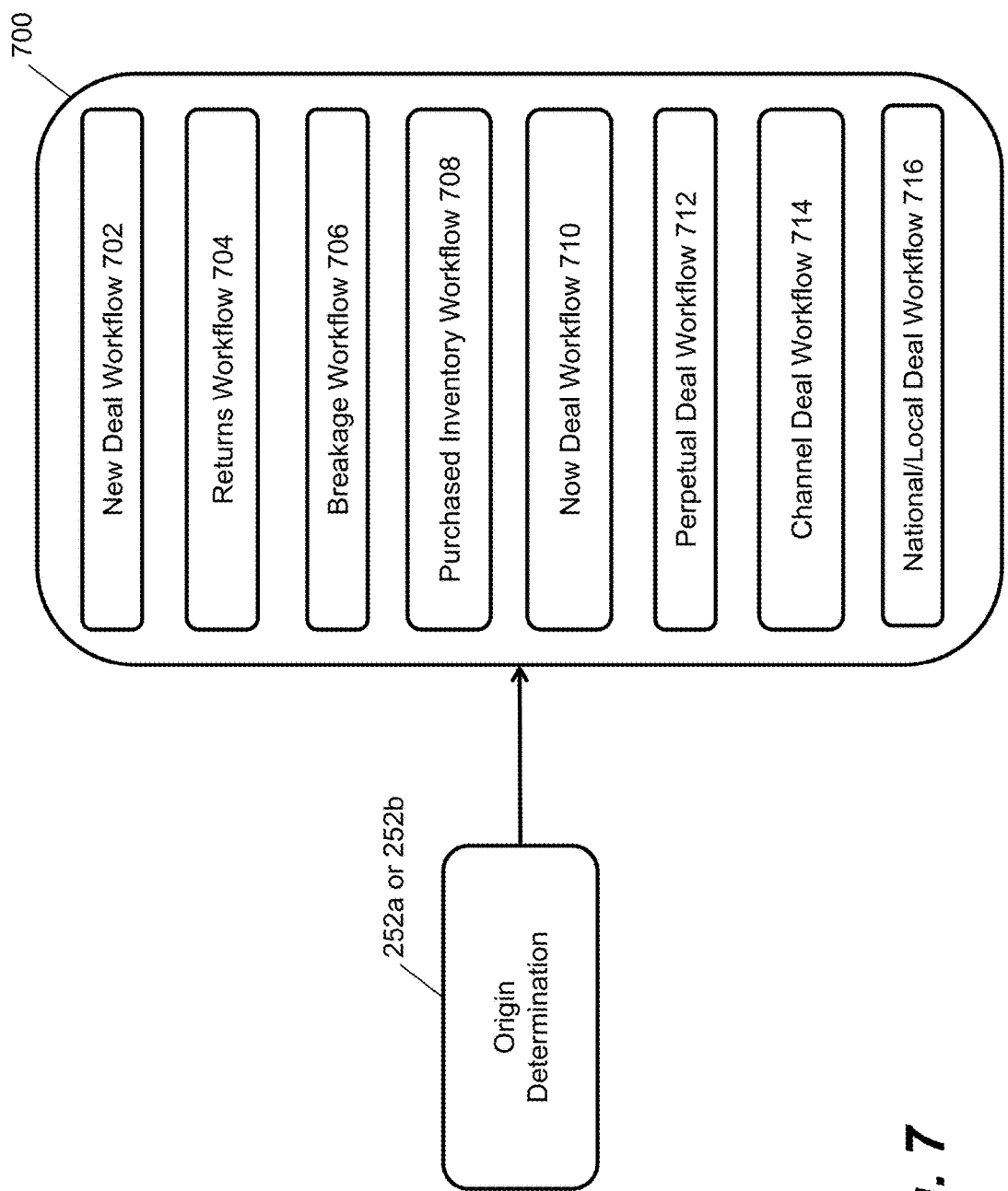
FIG. 7 is a block diagram for determining workflows.

The deal program collections may be populated in one of several ways. FIG. 7 illustrates several example workflows that are used to populate the deal program collections. Origin determination 226*a* or 226*b*, discussed previously in FIGS. 2A-2B, are configured to determine which of the following workflows 700 to execute including: a new deal workflow 702, a returns workflow 704, a breakage workflow 706, a purchased inventory workflow 708, a now deal workflow 710, a perpetual deal workflow 712, a channel deal workflow 714, and a national or local deal workflow 716. The workflows illustrated in FIG. 7 are merely for illustration purposes. Further, the workflows illustrated in FIG. 7 may use the deal analytical engine 200 and/or the sales enhancement analytical engine 234*a* or 234*b*, which may be tailored to each of the specific origins. Alternatively, one, some, or all of the workflows may have assigned to them a respective deal analytical engine.

A new deal workflow 702 comprises a workflow that determines how to distribute the units of a new deal program amongst the different deal collections. As discussed above, the units from a new deal program may be distributed to a first deal program in the first deal program collection and a second deal program in the second deal program collection based on a predetermined percentage. A returns workflow 704 is discussed in more detail with respect to FIG. 9. A breakage workflow 706 is discussed in more detail with respect to FIG. 10. A purchased inventory workflow 708 is a workflow in which inventory (such as a predetermined number of units) may be purchased from an original deal program. This is one of the examples in which deal programs in the deal program collections may be based on an original deal program. A perpetual deal workflow 712 may indicate a workflow in which a deal program may perpetually be populated in a deal program collection. A channel deal workflow 714 may include a deal program for a specific channel (or type of deal). As discussed above, deal programs may be compiled or aggregated into different deal program collections. For example, a deal program directed to a specific channel (or type of deal) may have its own deal program collection (so that different deal channels, such as restaurants, goods, etc., have their own channels. Alternatively, deal programs may be compiled within a single deal program collection. A national or local deal workflow 716 may include populating different deal program collections of varying geographic scope. For example, a deal program collection may be directed to national deals (in which consumers are targeted for deal programs in the collection regardless of the consumers' location within the nation). As another example, a deal program collection may be directed to local region deals (in which consumers are targeted for deal programs in the collection only if the consumers' location is within the local region). Alternatively, deal programs directed to the national deals or to the local deals may be associated with a single deal program collection.

Figure 8:
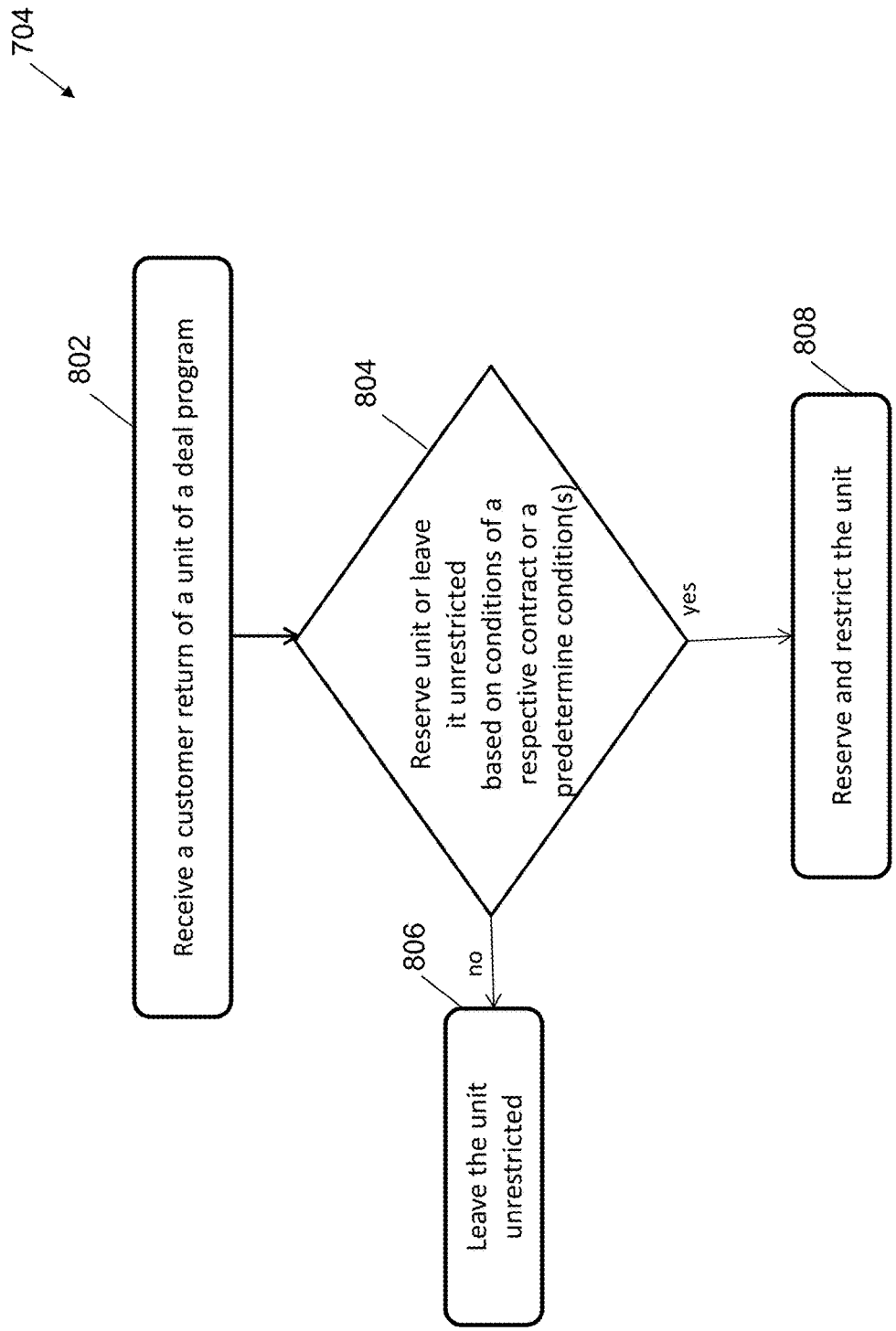
FIG. 8 is a flow diagram for a returns workflow.

FIG. 8 illustrates a flow diagram of an example returns workflow 704. At 802, the sales enhancement system receives a customer return of a unit of a deal program. At 804, the sales enhancement system determines whether to reserve that unit or leave it unrestricted based on conditions of a respective contract or a predetermine condition(s). According to the determination, at 906, the unit may be left unrestricted. Otherwise, at 908, the unit is restricted and reserved. The unit may be reserved, for example, by reassigning the unit from a first deal program in the first deal program collection to a second deal program in the second deal program collection. After reassignment, a unit in the second deal program can be associated with attributes of the second deal program (such as the relevance attributes of the second deal program), so that the attributes of the second deal program are met in order to transmit a related impression of the reassigned unit. Also, the number of returned units associated with the second deal program collection may be capped, where the determination on the cap on returns, as well as any determination described herein, may be determined based on historical information or real-time information, by the sales enhancement system, the relevance system, or a combination thereof. Further, in this workflow and others, restricting a unit may include, without limitation, making an impression related to the unit undiscoverable by a majority of consumers and only discoverable to a predetermined group of consumers. The predetermined group can be highly personalized, or broad enough to include a large number of consumers. For example, a broad grouping may include all consumers of a predetermined sex that reside in a predetermined geographic region.

Figure 9:
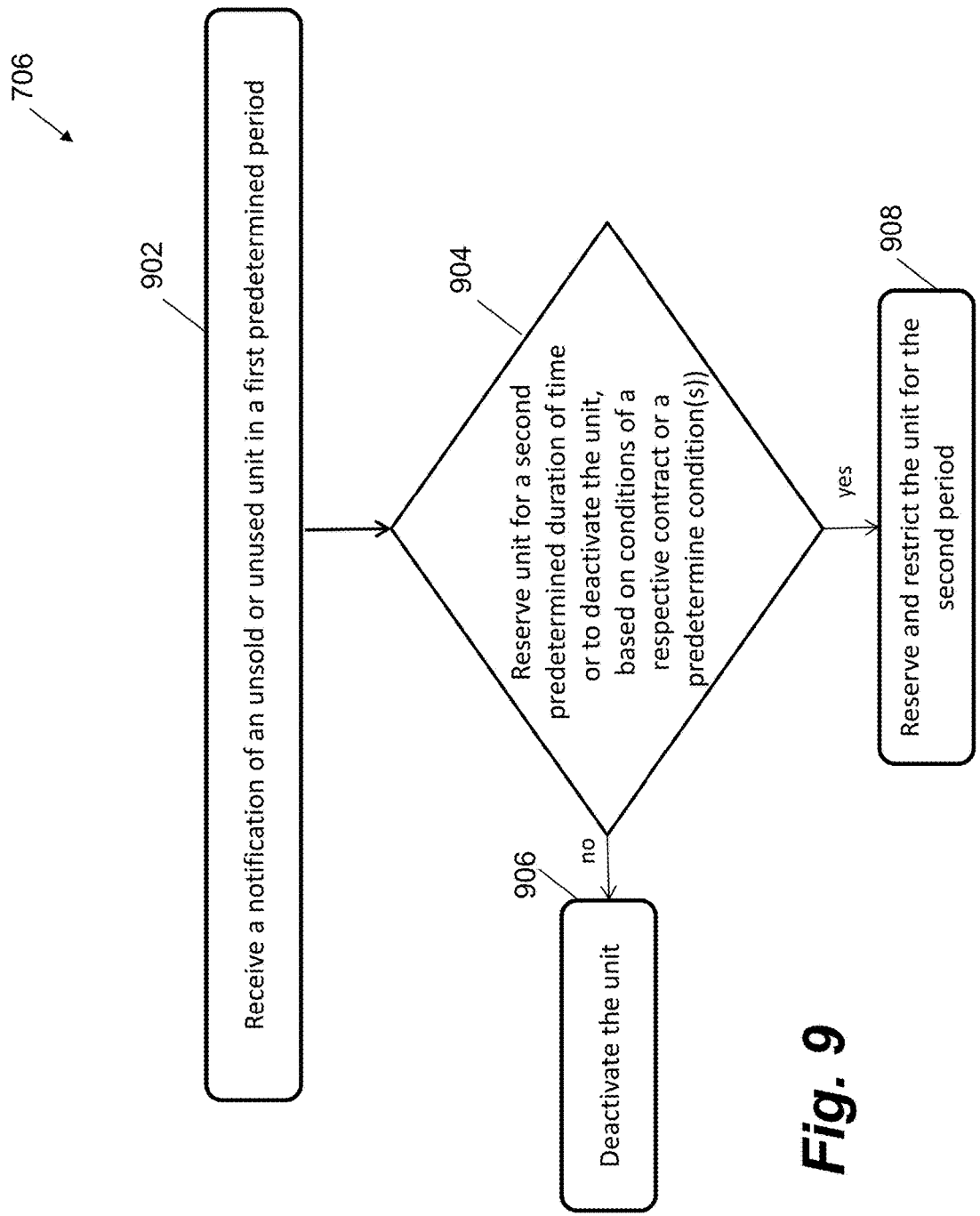
FIG. 9 is a flow diagram for a breakage workflow.

FIG. 9 illustrates a flow diagram of an example breakage workflow 706, which may be similar to a workflow for units unsold by the deal provider or a workflow for units unused by a consumer within a predetermined period of the deal program. At 902, the sales enhancement system receives a notification of an unsold, unused, broken unit in a first predetermined period of the deal program. At 904, the sales enhancement system determines whether to reserve and restrict the unit for a second predetermined duration of time or deactivate the unit, based on conditions of a respective contract or a predetermine condition(s). At 906, the sales enhancement system deactivates the unit, or at 908 reserves and restricts the unit for the second predetermined period. For example, a coupon (or reference to the coupon) unused within a predetermined period to use the coupon (e.g., breakage of a coupon) can be associated with the second deal program collection. Also, like the returns workflow, the sales enhancement system may limit the number of unused, unsold, or broken units associated with the second deal program collection by a predetermined cap on unused, unsold, or broken units, respectively.

In still another embodiment, a method and apparatus is disclosed. The method includes: storing in a first deal program collection a first set of units associated with a deal program for a first predetermined period; storing in a second deal program collection a second set of units associated with the deal program for a second predetermined period; setting parameters associated with the first set of units; setting parameters associated with the second set of units; transmitting an impression associated with the first set of units to any consumer during the first predetermined period, based on the parameters set associated with the first set of units; and transmitting an impression associated with the second set of units to a predetermined consumer during the second predetermined period, based on the parameters set associated with the second set of units. The apparatus includes the sales enhancement system configured to include the functionality of the method.

Figure 10:
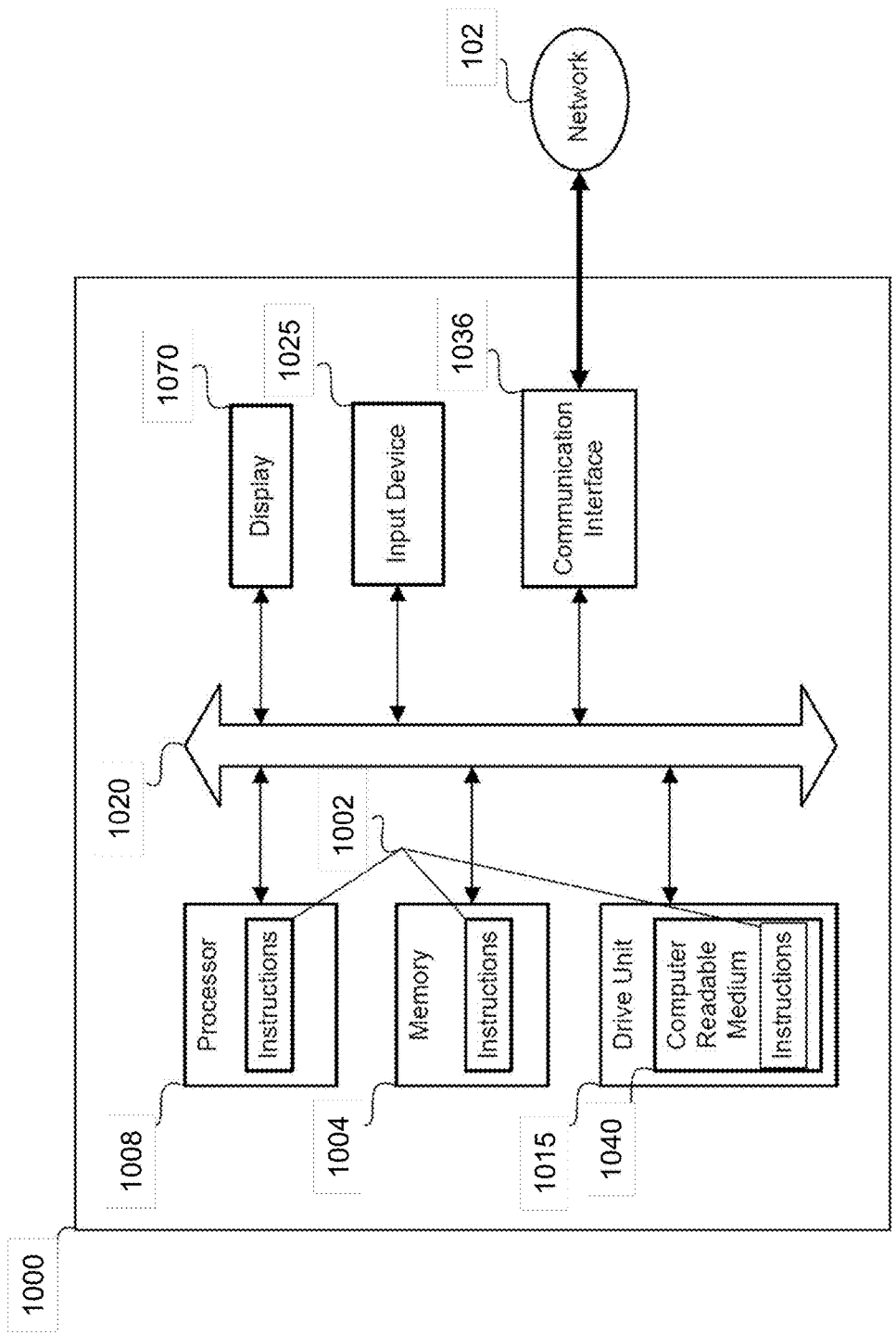
FIG. 10 is a general computer system, programmable to be a specific computer system, which may represent any of the computing devices referenced herein, such as the relevance system.

FIG. 10 illustrates a general computer system 1000, programmable to be a specific computer system 1000, which can represent any server, computer or component, such as the consumer 1 (104), the consumer N (106), the merchant 1 (108), the merchant M (110), the Groupon® server 112, the relevance system 114a or 114b, the VIP system 144a or 144b, the pre-feature system 146a or 146b, the feature system 148a or 148b, the sales enhancement system 150a or 150b, the search engine system 116, and the 3rd party server 118. The computer system 1000 may include an ordered listing of a set of instructions 1002 that may be executed to cause the computer system 1000 to perform any one or more of the methods or computer-based functions disclosed herein. The computer system 1000 can operate as a stand-alone device or can be connected, e.g., using the network 102, to other computer systems or peripheral devices.

In a networked deployment, the computer system 1000 can operate in the capacity of a server or as a client-user computer in a server-client user network environment, or as a peer computer system in a peer-to-peer (or distributed) network environment. The computer system 1000 can also be implemented as or incorporated into various devices, such as a personal computer or a mobile computing device capable of executing a set of instructions 1002 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 1000 can include a memory 1004 on a bus 1020 for communicating information. Code operable to cause the computer system to perform any of the acts or operations described herein can be stored in the memory 1004. The memory 1004 can be a random-access memory, read-only memory, programmable memory, hard disk drive or any other type of volatile or non-volatile memory or storage device.

The computer system 1000 can include a processor 1008, such as a central processing unit (CPU) and/or a graphics processing unit (GPU). The processor 1008 can include one or more general processors, digital signal processors, application specific integrated circuits, field programmable gate arrays, digital circuits, optical circuits, analog circuits, combinations thereof, or other now known or later-developed devices for analyzing and processing data. The processor 1008 can implement the set of instructions 1002 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 1000 can also include a disk or optical drive unit 1015. The disk drive unit 1015 can include a computer-readable medium 1040 in which one or more sets of instructions 1002, e.g., software, can be embedded. Further, the instructions 1002 can perform one or more of the operations as described herein. The instructions 1002 can reside completely, or at least partially, within the memory 1004 or within the processor 1008 during execution by the computer system 1000. Accordingly, the databases 206 or 260 can be stored in the memory 1004 or the disk unit 1015.

The memory 1004 and the processor 1008 also can include computer-readable media as discussed above. A "computer-readable medium," "computer-readable storage medium," "machine readable medium," "propagated-signal medium," or "signal-bearing medium" can include any device that has, stores, communicates, propagates, or transports software for use by or in connection with an instruction executable system, apparatus, or device. The machine-readable medium can selectively be, but not limited to, an electronic, magnetic, optical, electromagnetic, infrared, or semiconductor system, apparatus, device, or propagation medium.

Additionally, the computer system 1000 can include an input device 1025, such as a keyboard or mouse, configured for a user to interact with any of the components of system 1000. It can further include a display 1070, such as a liquid crystal display (LCD), a cathode ray tube (CRT), or any other display suitable for conveying information. The display 1070 can act as an interface for the user to see the functioning of the processor 1008, or specifically as an interface with the software stored in the memory 1004 or the drive unit 1015.

The computer system 1000 can include a communication interface 1036 that enables communications via the communications network 102. The network 102 can include wired networks, wireless networks, or combinations thereof. The communication interface 1036 network can enable communications via any number of communication standards, such as 802.11, 802.17, 802.20, WiMax, 802.15.4, cellular telephone standards, or other communication standards, as discussed above. Simply because one of these standards is listed does not mean any one is preferred, as any number of these standards can never actually be adopted in a commercial product.

Further, the relevance system 114*a* and sales enhancement system 150*b*, as depicted in FIGS. 2A and 2B, respectively, may comprise one computer system or multiple computer systems (each working in concert to provide the functionality described in FIGS. 2A and 2B). Block diagrams of different aspects of the system, including FIGS. 1A-1B and 2A-2B may be implemented using the computer functionality disclosed in FIG. 10. Further, the flow diagrams illustrated in FIGS. 4A-9 may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives can be considered a distribution medium that can be a tangible storage medium. The computer-readable medium is preferably a tangible storage medium. Accordingly, the disclosure can be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, can be constructed to implement one or more of the methods described herein. Applications that can include the apparatus and systems of various embodiments can broadly include a variety of electronic and computer systems. One or more embodiments described herein can implement functions using two or more specific interconnected hardware modules or devices with related control and data signals that can be communicated between and through the modules, or as portions of an application-specific integrated circuit. Accordingly, the present system can encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method for managing consumer accessibility to a deal program as the deal program progresses through each of a plurality of time periods, the method comprising:

segmenting the deal program into a plurality of deal program portions, including at least a first deal program portion and a second deal program portion, each of the deal program portions comprising particular characteristics associated with a particular time period, wherein each of the deal program portions configured to for use in a respective time period, and wherein each of the plurality of deal program portions configured to be associated with particular deal program collections;

associating, in one or more memories, the first deal program portion during a first time period with a first deal program collection, wherein the first deal program collection comprises a compilation of different deal programs, each configured for use during the first time period, wherein each deal program collection is configured to communicate via a particular class of electronic correspondence;

during the first time period, determining, via a relevance engine, one or more deal units from the first deal program collection to offer to a consumer, the consumer being one of one or more consumers, the one or more consumers selected in multiple geographic groupings, the multiple geographic groupings exhibiting a pre-determined distribution of values for a location attribute;

providing, during the first time period, an impression associated with one or more deal units from the first deal program via a first particular class of electronic correspondence, the first particular class of electronic correspondence being at least one of a text message or email, wherein the first particular class of electronic correspondence comprises a link such that activation of the link enables an electronic device to access an associated data page and provide payment of a fee associated with acceptance of an offer provided in the impression, the impression associated with the one or more deal units from the first deal program only discoverable to a predetermined grouping of consumers associated with a value for the location attribute indicative of a predetermined geographic region;

determining to reserve a predetermined portion of a number of available deal units for the first deal program collection;

dynamically modifying, in real-time, the predetermined portion of the number of available deal units for first deal program collection by adding to or restricting deals from the first deal program collection based on a real-time location of each of the one or more consumers;

receiving a trigger, the trigger being, first, a reception of information indicative of a selection of the impression, wherein the information indicative of the selection of the impression comprises an indication that the consumer selected a link from an advertisement on a webpage, where content of the webpage and the advertisement relate to each other, the impression associated with the first deal program from the first deal program collection, and subsequently, a determination that the reception of the information indicative of the selection of the impression is outside an expiration time period;

wherein the first time period is a time period before the reception of the trigger, the trigger being the reception of information indicative of the selection of the impression, and subsequently, the determination that the reception of the information indicative of the selection of the impression is outside of the expiration time period;

upon the reception of the trigger, the triggering being, first, reception of the information indicative of the selection of the impression and the subsequent determination that the reception of the information indicative of the selection of the impression is outside the expiration time period, associating the first deal program during a second time period with a second deal program collection, the second time period being different from the first time period, the first deal program collection being different than the second deal program collection; and subsequent to the reception of the trigger:

first, identifying one or more deal units, available via a second deal program portion, from the second deal program collection to offer to the consumer; and providing, during the second time period, an impression associated with one or more deal units from the second deal program via a second particular class of electronic correspondence, the second particular class of electronic correspondence being a searchable web page, the impression associated with the one or more deal units from the second deal program now discoverable to a larger grouping of consumers, via the searchable web page, and not limited to the grouping of consumers associated with the value for the location attribute indicative of the predetermined geographic region.

2. The method of claim 1, wherein the trigger comprises receiving a request by the consumer for an acceptance or use of a deal within a predetermined time period.

3. The method of claim 1, wherein the trigger comprises a purchase of a deal from the first deal program collection; and wherein in response to the relevance engine detecting the purchase of a deal from the first deal program collection, searching the second deal program collection for an upsell deal related to the purchased deal.

4. The method of claim 1, further comprising receiving a request for a deal from a new consumer; and in response to the request, searching the second deal program collection for deals to offer the new consumer.

5. The method of claim 1, wherein the trigger for accessing deals in the first deal collection are different than for accessing deals in the second deal collection.

6. The method of claim 5, wherein the trigger further comprises determining to send a batch email.

7. A system for managing consumer accessibility to a deal program as the deal program progresses through each of a plurality of time periods, the system comprising:

a memory storing processor-executable instructions; and a processor in communication with the memory, where the processor is configured to execute the processor-executable instructions to:

segment the deal program into a plurality of deal program portions, including at least a first deal program portion and a second deal program portion, each of the deal program portions comprising particular characteristics associated with a particular time period, wherein each of the deal program portions configured to for use in a respective time period, and wherein each of the plurality of deal program portions configured to be associated with particular deal program collections;

associate the first deal program portion during a first time period with a first deal program collection, wherein the first deal program collection comprises a compilation of different deal programs, each configured for use during the first time period, wherein each deal program collection is configured to communicate via a particular class of electronic correspondence;

during the first time period, determine one or more deal units from the first deal program collection to offer to a consumer, the consumer being one of one or more consumers, the one or more consumers selected in multiple geographic groupings, the multiple geographic groupings exhibiting a pre-determined distribution of values for a location attribute;

provide, during the first time period, an impression associated with one or more deal units from the first deal program via a first particular class of electronic correspondence, the first particular class of electronic correspondence being at least one of a text message or email, wherein the first particular class of electronic correspondence comprises a link such that activation of the link enables an electronic device to access an associated data page and provide payment of a fee associated with acceptance of an offer provided in the impression, the impression associated with the one or more deal units from the first deal program only discoverable to a predetermined grouping of consumers associated with a value for the location attribute indicative of a predetermined geographic region;

determining to reserve a predetermined portion of a number of available deal units for the first deal program collection;

dynamically modifying, in real-time, the predetermined portion of the number of available deal units for the first deal program collection by adding to or restricting deals from the first deal program collection based on a real-time location of each of the one or more consumers;

receiving a trigger, the trigger being, first, a reception of information indicative of a selection of the impression, wherein the information indicative of the selection of the impression comprises an indication that the consumer selected a link from an advertisement on a webpage, where content of the webpage and the advertisement relate to each other, the impression associated with the first deal program from the first deal program collection, and subsequently, a determination that the reception of the information indicative of the selection of the impression is outside an expiration time period;

wherein the first time period is a time period before the detection of reception of the trigger, the trigger being the reception of information indicative of the selection of the impression, and subsequently, the determination that the reception of the information indicative of the selection of the impression is outside of the expiration time period;

upon the reception of the trigger, the triggering being, first, reception of the information indicative of the selection of the impression and the determination that the reception of the information indicative of the selection of the impression is outside the expiration time period, associate the first deal program during a second time period with a second deal program collection, the second time period being different from the first time period, the first deal program collection being different than the second deal program collection; and subsequent to the reception of the trigger:
first, identifying one or more deal units, available via a second deal program portion, the second deal program collection to offer to the consumer; and
during the second time period, an impression associated with one or more deal units from the second deal program via a second particular class of electronic correspondence, the second particular class of electronic correspondence being a searchable web page, the impression associated with the one or more deal units from the second deal program now discoverable to a larger grouping of consumers, via the searchable web page, and not limited to the grouping of consumers associated with the value for the location attribute indicative of the predetermined geographic region.

8. The system of claim 7, wherein the trigger comprises receiving a request by the consumer for an acceptance or use of a deal within a predetermined time period.

9. The system of claim 7, wherein the trigger comprises a purchase of a deal from the first deal program collection; and
wherein in response to the relevance engine detecting the purchase of a deal from the first deal program collection, the processor is configured to search the second deal program collection for an upsell deal related to the purchased deal.

10. The system of claim 7, wherein the processor is further configured to receive a request for a deal from a new consumer; and
in response to the request, the processor is configured to search the second deal program collection for deals to offer the new consumer.

11. The system of claim 7, wherein the trigger for accessing deals in the first deal collection are different than for accessing deals in the second deal collection.

12. The system of claim 11, wherein the trigger further comprises determining to send a batch email.

13. A computer program product, stored on a non-transitory computer readable medium, comprising instructions that when executed on one or more computers cause the one or more computers to perform operations implementing management if consumer accessibility to a deal program as the deal program progresses through each of a plurality of time periods, the operations comprising:

segmenting the deal program into a plurality of deal program portions, including at least a first deal program portion and a second deal program portion, each of the deal program portions comprising particular characteristics associated with a particular time period, wherein each of the deal program portions configured to for use in a respective time period, and wherein each of the plurality of deal program portions configured to be associated with particular deal program collections;

associating, in one or more memories, the deal program during a first time period with a first deal program collection, wherein the first deal program collection comprises a compilation of different deal programs, each configured for use during the first time period, wherein each deal program collection is configured to communicate via a particular class of electronic correspondence;

during the first time period, determining, via a relevance engine, one or more deal units from the first deal program collection to offer to a consumer, the consumer being one of one or more consumers, the one or more consumers selected in multiple geographic groupings, the multiple geographic groupings exhibiting a pre-determined distribution of values for a location attribute;

providing, during the first time period, an impression associated with one or more deal units from the first deal program via a first particular class of electronic correspondence, the first particular class of electronic correspondence being at least one of a text message or email, wherein the first particular class of electronic correspondence comprises a link such that activation of the link enables an electronic device to access an associated data page and provide payment of a fee associated with acceptance of an offer provided in the impression, the impression associated with the one or more deal units from the first deal program only discoverable to a predetermined grouping of consumers associated with a value for the location attribute indicative of a predetermined geographic region;

determining to reserve a predetermined portion of a number of available deal units for the first deal program collection;

dynamically modifying, in real-time, the predetermined portion of the number of available deal units for the first deal program collection by adding to or restricting deals from the first deal program collection based on a real-time location of each of the one or more consumers;

receiving a trigger, the trigger being, first, a reception of information indicative of a selection of the impression, wherein the information indicative of the selection of the impression comprises an indication that the consumer selected a link from an advertisement on a webpage, where content of the webpage and the advertisement relate to each other, the impression associated with the first deal program from the first deal program collection, and subsequently, a determination that the reception of the information indicative of the selection of the impression is outside an expiration time period;

wherein the first time period is a time period before the detection of reception of the trigger, the trigger being the reception of information indicative of the selection of the impression, and subsequently, the determination that the reception of the information indicative of the selection of the impression is outside of the expiration time period;

upon detection of the trigger, the triggering being, first, reception of the information indicative of the selection of the impression and the determination that the reception of the information indicative of the selection of the impression is outside the expiration time period, associating the first deal program during a second time period with a second deal program collection, the second time period being different from the first time period, the first deal program collection being different than the second deal program collection; and subsequent to the reception of the trigger:
first, identifying one or more deal units, available via a second deal program portion, from the second deal program collection to offer to the consumer; and providing, during the second time period, an impression associated with one or more deal units from the second deal program via a second particular class of electronic correspondence, the second particular class of electronic correspondence being a searchable web page, the impression associated with the one or more deal units from the second deal program now discoverable to a larger grouping of consumers, via the searchable web page, and not limited to the grouping of consumers associated with the value for the location attribute indicative of the predetermined geographic region.

14. The computer program product of claim 13, wherein the trigger comprises receiving a request by the consumer for an acceptance or use of a deal within a predetermined time period.

15. The computer program product of claim 13, further comprising receiving a request for a deal from a new consumer; and in response to the request, searching the second deal program collection for deals to offer the new consumer.

16. The computer program product of claim 13, wherein the trigger for accessing deals in the first deal collection are different than for accessing deals in the second deal collection.

* * * * *